(12) United States Patent
Ashdown et al.

(10) Patent No.: US 8,746,923 B2
(45) Date of Patent: Jun. 10, 2014

(54) CONTROL OF LUMINOUS INTENSITY DISTRIBUTION FROM AN ARRAY OF POINT LIGHT SOURCES

(71) Applicant: Cooledge Lighting Inc., Burnaby (CA)

(72) Inventors: Ian Ashdown, West Vancouver (CA); Michael A. Tischler, Scottsdale, AZ (US)

(73) Assignee: Cooledge Lighting Inc., Burnaby (CA)

( * ) Notice: Subject to any disclaimer, the term of this patent is extended or adjusted under 35 U.S.C. 154(b) by 0 days.

(21) Appl. No.: 13/693,632

(22) Filed: Dec. 4, 2012

(65) Prior Publication Data

US 2013/0141909 A1 Jun. 6, 2013

Related U.S. Application Data

(60) Provisional application No. 61/566,899, filed on Dec. 5, 2011, provisional application No. 61/583,691, filed on Jan. 6, 2012.

(51) Int. Cl.
*F21V 33/00* (2006.01)

(52) U.S. Cl.
USPC .......................................... 362/240

(58) Field of Classification Search
None
See application file for complete search history.

(56) References Cited

U.S. PATENT DOCUMENTS

| | | | |
|---|---|---|---|
| 6,072,171 A | 6/2000 | Nakamura et al. |
| 6,111,244 A | 8/2000 | Wang |
| 6,498,356 B1 | 12/2002 | Sekiya et al. |
| 6,654,175 B2 | 11/2003 | Brophy et al. |
| 6,987,613 B2 | 1/2006 | Pocius et al. |
| 7,161,311 B2 | 1/2007 | Mueller et al. |
| 7,250,611 B2 | 7/2007 | Aguirre et al. |
| 7,259,400 B1 | 8/2007 | Taskar |
| 7,286,296 B2 | 10/2007 | Chaves et al. |
| 7,329,982 B2 | 2/2008 | Conner et al. |
| 7,330,319 B2 | 2/2008 | Ouderkirk et al. |
| 7,344,902 B2 | 3/2008 | Basin et al. |
| 7,355,284 B2 | 4/2008 | Negley |
| 7,397,177 B2 | 7/2008 | Takahashi et al. |
| 7,452,737 B2 | 11/2008 | Basin et al. |
| 7,525,126 B2 | 4/2009 | Leatherdale et al. |
| 7,573,073 B2 | 8/2009 | Leatherdale et al. |
| 7,645,054 B2 | 1/2010 | Goihl |
| 7,646,029 B2 | 1/2010 | Mueller et al. |
| 7,683,475 B2 | 3/2010 | Lee et al. |
| 7,692,207 B2 | 4/2010 | Erchak et al. |

(Continued)

FOREIGN PATENT DOCUMENTS

| | | |
|---|---|---|
| CN | 101477229 A | 7/2009 |
| CN | 101636851 A | 1/2010 |

(Continued)

OTHER PUBLICATIONS

International Search Report and Written Opinion mailed May 24, 2013 for International Application No. PCT/US2012/067698 (10 pages).

*Primary Examiner* — Britt D Hanley

(74) *Attorney, Agent, or Firm* — Bingham McCutchen LLP

(57) ABSTRACT

In various embodiments, a lens array comprises a plurality of aspheric lens elements each optically coupled to a light-emitting element and producing an out-of-focus image thereof. The images combine to generate a target luminous intensity distribution, e.g., providing constant illuminance on a plane.

20 Claims, 25 Drawing Sheets

(56) References Cited

U.S. PATENT DOCUMENTS

| | | |
|---|---|---|
| 7,709,853 B2 | 5/2010 | Medendorp, Jr. |
| 7,726,835 B2 | 6/2010 | Bogner et al. |
| 7,736,019 B2 | 6/2010 | Shimada et al. |
| 7,798,678 B2 | 9/2010 | Destain |
| 7,804,147 B2 | 9/2010 | Tarsa et al. |
| 7,806,577 B2 | 10/2010 | Van As et al. |
| 7,816,638 B2 | 10/2010 | Olson et al. |
| 7,821,023 B2 | 10/2010 | Yuan et al. |
| 7,841,741 B2 | 11/2010 | Chan et al. |
| 7,883,226 B2 | 2/2011 | Li |
| 7,898,665 B2 | 3/2011 | Brukilacchio et al. |
| 7,932,970 B2 | 4/2011 | Kim et al. |
| 7,943,952 B2 | 5/2011 | Loh et al. |
| 7,948,001 B2 | 5/2011 | Kamada et al. |
| 7,952,107 B2 | 5/2011 | Daniels et al. |
| 7,956,368 B2 | 6/2011 | Nagai et al. |
| 7,959,325 B2 | 6/2011 | Roberts et al. |
| 7,980,743 B2 | 7/2011 | Loh |
| 8,003,416 B2 | 8/2011 | Lin et al. |
| 2005/0179041 A1 | 8/2005 | Harbers et al. |
| 2005/0201109 A1 | 9/2005 | Shimura |
| 2006/0187653 A1 | 8/2006 | Olsson |
| 2007/0126020 A1 | 6/2007 | Lin et al. |
| 2007/0257271 A1 | 11/2007 | Ouderkirk et al. |
| 2008/0023711 A1 | 1/2008 | Tarsa et al. |
| 2008/0157114 A1 | 7/2008 | Basin et al. |
| 2008/0212319 A1 | 9/2008 | Klipstein |
| 2008/0225549 A1 | 9/2008 | Dassanayake et al. |
| 2008/0273332 A1 | 11/2008 | Luettgens et al. |
| 2009/0059614 A1 | 3/2009 | Henson et al. |
| 2009/0065792 A1 | 3/2009 | Thompson et al. |
| 2009/0078950 A1 | 3/2009 | Sun |
| 2009/0200704 A1 | 8/2009 | Yamada et al. |
| 2009/0225543 A1 * | 9/2009 | Jacobson et al. ............... 362/247 |
| 2010/0027256 A1 | 2/2010 | Kinoshita |
| 2010/0053979 A1 | 3/2010 | Gigioli, Jr. |
| 2010/0067229 A1 | 3/2010 | Scotch et al. |
| 2010/0127283 A1 | 5/2010 | van de Ven et al. |
| 2010/0147358 A1 | 6/2010 | Ohtorii |
| 2010/0155763 A1 | 6/2010 | Donofrio et al. |
| 2010/0166407 A1 | 7/2010 | Iwanaga et al. |
| 2010/0172123 A1 | 7/2010 | Gomi |
| 2010/0265597 A1 | 10/2010 | Shyu |
| 2011/0063723 A1 | 3/2011 | Shyu et al. |
| 2011/0063840 A1 | 3/2011 | Anderson et al. |
| 2011/0063857 A1 | 3/2011 | Li et al. |
| 2011/0193499 A1 | 8/2011 | Harbers et al. |
| 2011/0248289 A1 | 10/2011 | Hsieh et al. |

FOREIGN PATENT DOCUMENTS

| | | |
|---|---|---|
| DE | 102008031930 A1 | 1/2010 |
| EP | 1158761 A1 | 11/2001 |
| EP | 1371901 A2 | 12/2003 |
| EP | 1657758 A2 | 5/2006 |
| EP | 1885003 A2 | 2/2008 |
| JP | 08001998 A | 1/1996 |
| WO | WO-03036720 A2 | 5/2003 |
| WO | WO-2005119314 A2 | 12/2005 |
| WO | WO-2008100991 A1 | 8/2008 |

* cited by examiner

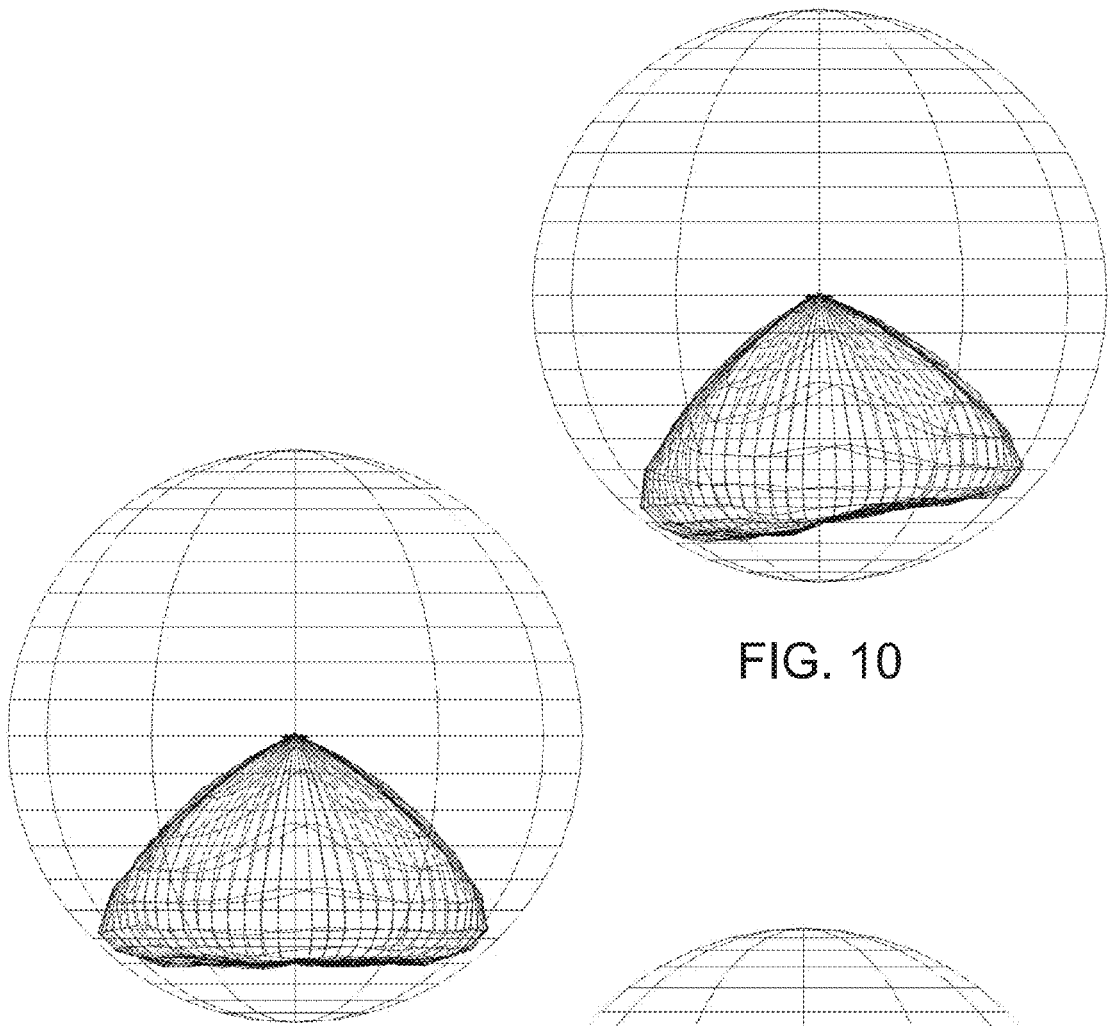
FIG. 10
FIG. 11A
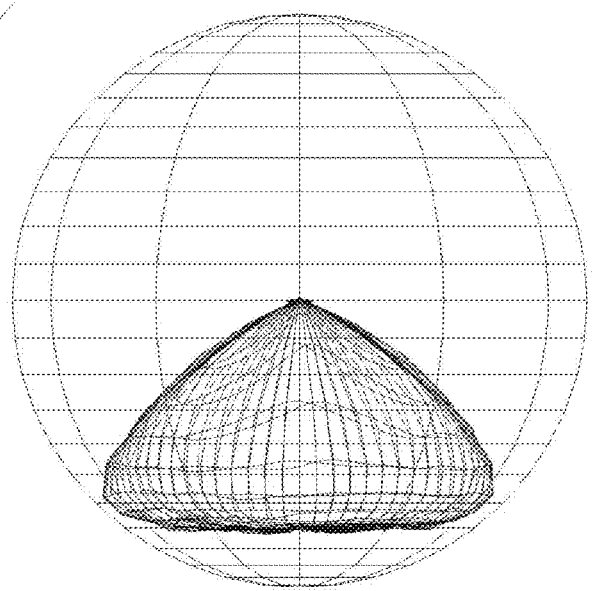
FIG. 11B

CONTROL OF LUMINOUS INTENSITY DISTRIBUTION FROM AN ARRAY OF POINT LIGHT SOURCES

CROSS-REFERENCE TO RELATED APPLICATIONS

This application claims priority to, and the benefits of, U.S. Ser. Nos. 61/566,899, filed on Dec. 5, 2011, and 61/583,691, filed on Jan. 6, 2012, the entire disclosures of which are hereby incorporated by reference.

TECHNICAL FIELD

The present invention relates to the control of luminous intensity distribution from an array of point light sources. More particularly, the invention relates to modification of the Lambertian luminous intensity distribution of an array of light-emitting elements into a distribution that provides spatially constant illumination of a planar surface.

BACKGROUND

Bare phosphor-coated lighting-emitting diodes (i.e., unencapsulated light-emitting diode (LED) die with a conformal phosphor coating) typically exhibit a Lambertian luminous intensity distribution that is described by:

$$I(\theta) = I_n \times \cos(\theta)$$

where $I_n$ is the intensity measured perpendicular to the light-emitting surface and $I(\theta)$ is the intensity measured at angle $\theta$ from the surface normal. A schematic luminous intensity plot of such a Lambertian emitter is shown in FIG. 1, where the light source is located at the center of the large sphere and points on the smaller sphere represent the intensity plot—i.e., the intensity value as a function of angle from the normal. As shown in the figure, the apparent brightness to an observer is the same regardless of the observer's angle of view.

For many lighting applications, however, it is desirable for luminaires to have a luminous intensity distribution such that the illuminance of the workplane below the luminaire or the ceiling above the luminaire is substantially constant. For an infinite linear source, the illuminance E of a plane parallel to and at a distance $d_n$ from the light source is given by:

$$E(\theta) = I(\theta) \times \cos^2(\theta)/d_n$$

where $\theta$ is the angle in the direction perpendicular to the linear light source. To maintain spatially constant illuminance with a linear light source, it is therefore necessary that:

$$I(\theta) = I_n/\cos^2(\theta)$$

in the direction perpendicular to the light source axis.

Again, however, for architectural applications, and in particular for office lighting, luminaires with linear fluorescent lamps are typically arranged in parallel rows such that their luminous intensity distributions overlap. As such, a more desirable intensity distribution is:

$$I(\theta) = /\cos(\theta)$$

Luminaires designed for office lighting applications generally also comply with the recommendations of ANSI/IES RP-1, Office Lighting, which limits the luminous intensity at oblique viewing angles. A theoretical luminous intensity distribution satisfying these requirements over the range $-30° < \theta < 30°$ is shown in FIG. 2. One attempt to realize this distribution is the direct-indirect linear fluorescent luminaire (Model 7306T02IN as manufactured by Ledalite, Langley, BC, Canada), the measured luminous intensity distribution of which is shown in FIG. 3A (viewed perpendicular to the lamp axis) and FIG. 3B (viewed parallel to the lamp axis).

The downward component illustrated in FIG. 3A exhibits a distribution similar to that of FIG. 2, while the downward component of FIG. 3B exhibits a substantially Lambertian distribution similar to FIG. 1. The latter distribution is a consequence of the fact that four-foot fluorescent lamps are essentially linear light sources, so the luminous intensity distribution in the direction parallel to the lamp axis cannot be controlled without substantial light losses, and also need not satisfy the inverse cosine relationship: the continuous distribution of light along the length of the luminaires will tend to provide constant illuminance on the workplane or ceiling in the same direction. However, the recommendations of ANSI/IES RP-1 must still be satisfied for many commercial applications.

For illuminated ceilings in open-plan offices, ANSI/IES RP-1, Office Lighting, also recommends a brightness uniformity ratio of 8:1 or less, and preferably 4:1 or even 2:1 if possible. This is typically accomplished with linear fluorescent luminaires having a so-called "batwing" luminous intensity distribution, such as is exhibited, for example, by the upward component of the luminous intensity distribution shown in FIGS. 3A and 3B. The ideal batwing distribution is similar to FIG. 2, but with a wider range. Assuming a typical suspension distance of 16 inches below the ceiling and a luminaire row operation of 6 feet, the range of constant illuminance should be at least $-65° < \theta < 65°$. Another approach is to optically couple high-power LED packages with external optics. The resulting distribution, however, may be too collimated for most architectural lighting applications, and the optical assembly too large for most luminaire designs.

There are in addition applications requiring an asymmetric luminous intensity distribution. As one example, linear fluorescent luminaires are often mounted on walls near the ceiling of a room as "cove lighting" to provide substantially constant illumination of the wall surface, typically with the use of physically large asymmetric reflectors.

There is, therefore, a need for a monolithic optical lens design that can generate a luminous intensity distribution from an array of light-emitting elements to provide spatially constant illumination of a surface, such as a workplane, ceiling or wall, and in a form factor that is compatible with the optical, mechanical and aesthetic design requirements of luminaires intended for architectural applications such as office lighting.

SUMMARY

In various embodiments, the present invention exploits the ability to achieve a predetermined light intensity distribution from a light source by intentionally designing an optical element to produce an out-of-focus image of the source. This approach is used, for example, to design single-lens optical elements for light-emitting element arrays. In one exemplary implementation, the constant illuminance distribution of a plane is achieved with a single aspheric lens. In contrast to free-form lens designs, the present approach may begin with a spherical lens profile, which is modified until the resulting profile is described by the lowest-order mathematical equation that will generate the desired luminous intensity distribution. An evolutionary algorithm, for example, may be employed to determine the lowest-order mathematical equation that will generate the desired luminous intensity distribution. Typically, the equation is a cubic or lower-order equation, and the lens may have a conventional or Fresnel design. In some embodiments the lens profile is hyperbolic, and in other embodiments it is conical. A luminaire based on a light-emitting element array may utilize single-lens optical elements designed in accordance herewith to produce spatially constant illumination over a planar surface.

Accordingly, in one aspect, the invention pertains to a luminaire producing a light distribution that provides predetermined luminous intensity distribution. In various embodiments, the luminaire comprises an array of light-emitting elements, and, disposed over the light-emitting elements, a lens array that itself comprises a plurality of aspheric lens elements each optically coupled to a respective one of light-emitting elements and producing an out-of-focus image thereof; the images combine to generate a predetermined luminous intensity distribution. In some embodiments, the lens elements each have a lens profile described by the lowest-order mathematical equation that generates a predetermined luminous intensity distribution when light emitted by the light-emitting elements and passing through the lens elements is combined, and the profile specifies a lens shape and a lens thickness. The predetermined luminous intensity distribution may, for example, correspond to spatially constant illumination of a planar surface.

In some embodiments, the lens elements each produce a narrow beam and collectively produce the predetermined luminous intensity distribution. The equation may comprise parameters including a refractive index of the lens and dimensions of the light-emitting element, and the thickness may correspond to a distance from a front surface of the lens element to the light-emitting element. The equation may, for example, be a quadratic equation, a cubic equation, or other suitable expression.

Each lens element may be a Fresnel lens or a conventional lens. The lens elements may each have a rotationally symmetric profile, e.g., an aspheric cubic lens profile, an aspheric cubic linear lens profile, a hyperbolic lens profile, or a conic linear lens profile, and the luminaire may have lens elements with a single profile or a combination of profiles. In some embodiments, each lens element produces a batwing luminous distribution profile or a substantially collimated light distribution profile, e.g., having a beam angle or full width at half maximum (FWHM) less than 15°. The light distribution of each lens element may be asymmetric, e.g., an asymmetric collimated light distribution. The center of each light-emitting element may be shifted relative to the center of the corresponding aspheric lens element, or may be substantially aligned with the center of the corresponding aspheric lens element.

In another aspect, the invention relates to a method of manufacturing a luminaire for achieving a predetermined luminous intensity distribution. In various embodiments, the method comprises the steps of designing one or more optical elements to produce an out-of-focus image of a light source by computationally modifying an initial lens profile (e.g., a spherical profile) until a resulting profile is described by the lowest-order mathematical equation that will generate the predetermined light intensity distribution from the light source; providing a plurality of the light sources arranged in an array; manufacturing a plurality of the optical elements; and associating the optical elements with the light sources such that each of the optical elements produces an out-of-focus image of an associated light source, such that the images combine to generate the predetermined luminous intensity distribution.

In still another aspect, the invention pertains to a method of manufacturing an optical element for achieving a predetermined luminous intensity distribution. In various embodiments, the method comprises the steps of generating a design for one or more optical elements to produce an out-of-focus image of a light source by computationally modifying an initial lens profile (e.g., a spherical profile) until a resulting profile is described by the lowest-order mathematical equation that will generate the predetermined luminous intensity distribution from the light source; and manufacturing the optical element in accordance with the design. In various embodiments, the optical element is a lens, and the lens is manufactured by molding or embossing.

These and other objects, along with advantages and features of the present invention herein disclosed, will become more apparent through reference to the following description, the accompanying drawings, and the claims. Furthermore, it is to be understood that the features of the various embodiments described herein are not mutually exclusive and can exist in various combinations and permutations. Reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. The headings provided herein are for convenience only and are not intended to limit or interpret the scope or meaning of the claimed technology. The term "light" broadly connotes any wavelength or wavelength band in the electromagnetic spectrum, including, without limitation, visible light, ultraviolet radiation, and infrared radiation. Similarly, photometric terms such as "illuminance," "luminous flux," and "luminous intensity" extend to and include their radiometric equivalents, such as "irradiance," "radiant flux," and "radiant intensity." The term "substantially" means ±10%, and in some embodiments, ±5%.

BRIEF DESCRIPTION OF THE DRAWINGS

In the drawings, like reference characters generally refer to the same parts throughout the different views. Also, the drawings are not necessarily to scale, with an emphasis instead generally being placed upon illustrating the principles of the invention.

In the following description, various embodiments of the present invention are described with reference to the following drawings, in which:

FIG. 10 graphically depicts the horizontal luminous intensity distribution generated by a lens having the profile shown in FIG. 5 with an altered horizontal offset.

FIGS. 11A and 11B graphically depict horizontal luminous intensity distributions generated by a lens having the profile shown in FIG. 5 with phosphor layers of different thicknesses.

DETAILED DESCRIPTION

The approach of the present invention is based upon an aesthetic photographic quality called "bokeh." As discussed in Nasse, H. H., *Depth of Field and Bokeh*, Oberkochen, Germany: Carl Zeiss Camera Lens Division (2010) (hereafter "Nasse," the entire disclosure of which is hereby incorporated by reference), bokeh is "a collective term for all attributes of [out-of-focus] blurring" of photographic images. It is a subjective metric in that out-of-focus blurring is dependent upon a large number of parameters, including picture format, focal length, f-number (effective aperture), t-number (lens transmission), camera-to-subject distance, distance to the background or foreground, shapes and patterns of the subject, aperture iris shape, lens aberrations, foreground/background brightness, and color.

With an ideal lens and a point light source, out-of-focus blurring is described by the "circle of confusion," which is a hard-edged circle of light. However, diffraction effects and lens aberrations invariably result in an out-of-focus image of a point light source having smooth edges and color fringing. As further discussed in Nasse, photographic camera lenses may be intentionally designed to produce aesthetically pleasing out-of-focus blurring. In contrast, Maksutov telescopes and other catadioptic lens-mirror designs produce severe "doughnut" bokeh patterns due to obstruction by their secondary mirrors.

Figure 3A:
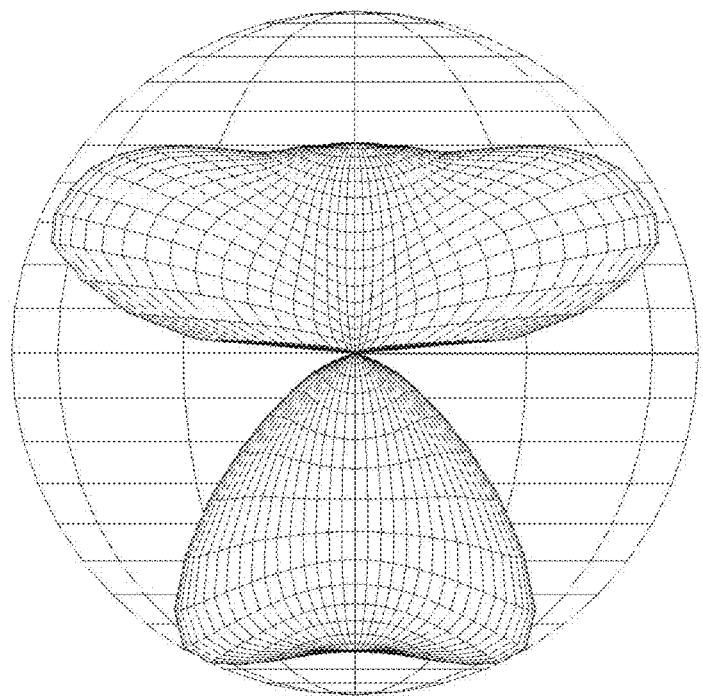
FIGS. 3A and 3B graphically depict the measured luminous intensity distribution of a direct-indirect linear fluorescent luminaire viewed, respectively, perpendicular and parallel to the lamp axis.
Figure 3B:
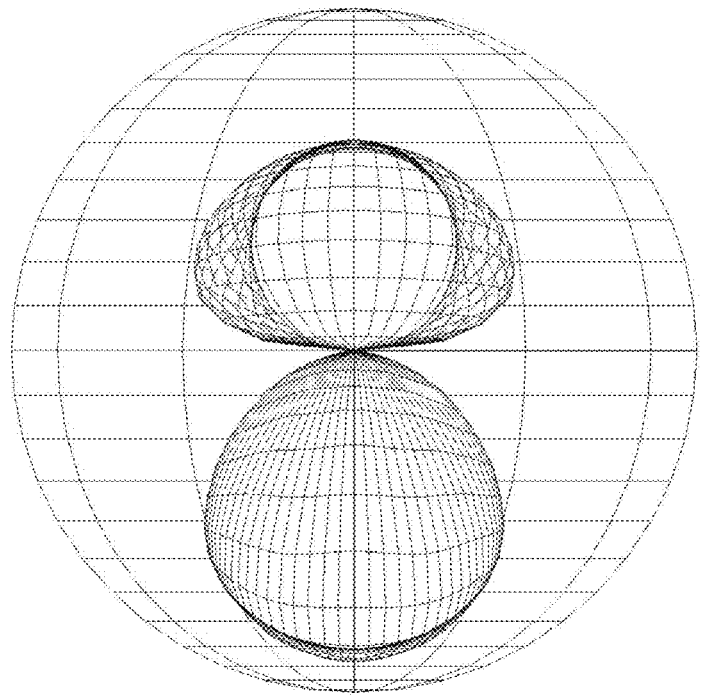

There are, however, physical limits on the control the lens designer has over the bokeh characteristics of a given lens design. Embodiments of the present invention apply the concept of bokeh to the distribution of light from light-emitting elements, such as an array of LEDs. In particular, there is a continuum of bokeh characteristics from the uniform circle of confusion for an ideal lens to the doughnut pattern of catadioptic lens-mirror designs. It therefore follows from the Helmholtz reciprocity principle (i.e., the direction of light can always be reversed) that the projected image of a physical light source will exhibit bokeh characteristics. As such, it becomes possible to achieve a predetermined light intensity distribution (such as, for example, FIG. 3A) from a light source by intentionally designing an optical element to produce an out-of-focus image of the source.

This approach is particularly advantageous for the design of single-lens optical elements for light-emitting element (e.g., LED) arrays. In accordance with the approach described herein, the constant illuminance distribution of a plane can be achieved with a single aspheric lens. In contrast to free-form lens designs (which may arbitrarily impose a refractive-total internal reflection (TIR) design constraint), the present approach may begin with an optical element consisting of a spherical lens profile, which is modified until the resulting profile is described by the lowest-order mathematical equation that will generate the desired luminous intensity distribution.

Using the lowest-order mathematical equation (such as for example a linear, quadratic, or cubic equation) is advantageous. Profiles described by higher-order equations (such as, for example, quintic equations) have higher degrees of curvature that tend to produce caustics in the near-field luminous intensity distribution and possibly visible striations on the plane illuminance distribution. The higher orders (e.g., $z=ax^5+bx^4+cx^3+dx^2+ex+f$) also introduce more design parameters that must be optimized, thereby increasing the size of the search space and decreasing the probability of converging to a local rather than global optimum.

A particular advantage of the present approach to optical elements used in architectural applications is that it represents a non-imaging application. Unlike the photographic lens design issues discussed in Nasse, most of the enumerated design parameters (which relate to precise image reproduction) become immaterial, thereby simplifying the design process and minimizing the search space for a globally optimal lens profile.

A representative approach to determining the lowest-order mathematical equation that will generate the desired luminous intensity distribution is an evolutionary algorithm that comprises the following steps:

1. Specify a target luminous intensity distribution;
2. Specify one or more candidate equations with different terms and constants;
3. Calculate the luminous intensity distribution for each candidate equation;
4. Compare each candidate intensity distribution with the target intensity distribution;
5. Modify the constants of the best candidates; and
6. Repeat steps 3 to 5 until the best candidate meets the target design criteria.

wherein the luminous intensity distribution comparisons in Step 4 may be based, for example, on the Hausdorff distance metric as disclosed in Ashdown, I., "Comparing Photometric Distributions," *Journal of the Illuminating Engineering Society* 29(1):25-33. (1999) (the entire disclosure of which is hereby incorporated by reference).

For Step 3, one calculation method for determining the luminous intensity distribution is to model the light source (typically as an areal or volumetric emitter rather than as point source) and lens using a non-sequential ray-tracing program. Suitable commercial software products include LightTools from Optical Research Associates (Pasadena, Calif.), FRED from Photon Engineering (Tucson, Ariz.), ZEMAX from Radiant ZEMAX LLC (Bellevue, Wash.), ASAP from Breault Research (Tucson, Ariz.), and TracePro from Lambda Research (Littleton, Mass.).

One approach to implementing this methodology is based on a particle-swarm optimization algorithm, as described, for example, in Xiangdong, Z. L, and X. Duan, "Comparative Research on Particle Swarm Optimization and Genetic Algorithm," *Computer and Information Science* 3(1):120-127 (2010) and Sancho-Pradel, D. L., "Particle Swarm Optimization for Game Programming," in Game Programming 8, pp. 152-167, the entire disclosures of which are hereby incorporated by reference. In accordance with this approach, the algorithm models the behavior of a flock of birds in pursuit of feeding opportunities. Adapted to the present problem, the flock of birds (or "particles") is represented by the set of candidate equations with different terms and constants, while the feeding opportunity (i.e., the solution) is represented by the target luminous intensity distribution.

Like genetic algorithms, particle-swarm optimization algorithms are instances of evolutionary algorithms, and so can be used to implement the six steps outlined above. In Step 2, however, the terms and constants of the equations represent the multidimensional "equations of motion" of each candidate equation. In canonical form, these equations can be expressed as:

$$v(t+\Delta t)=v_{inertia}(t)+v_{cognitive}(t)+v_{social}(t)$$

$$x(t+\Delta t)=x(t)+v(t+\Delta t)$$

where $x(t)$ and $v(t)$ are m-dimensional vectors that represent the particle's position and velocity in the multidimensional space at time t, with $\Delta t=1$ representing the iteration step time, and the dimension m of the multidimensional space being the maximum number of terms (i.e., order) of the equations under consideration. (Of course, non-polynomial equations may also be considered.)

Figure 1:
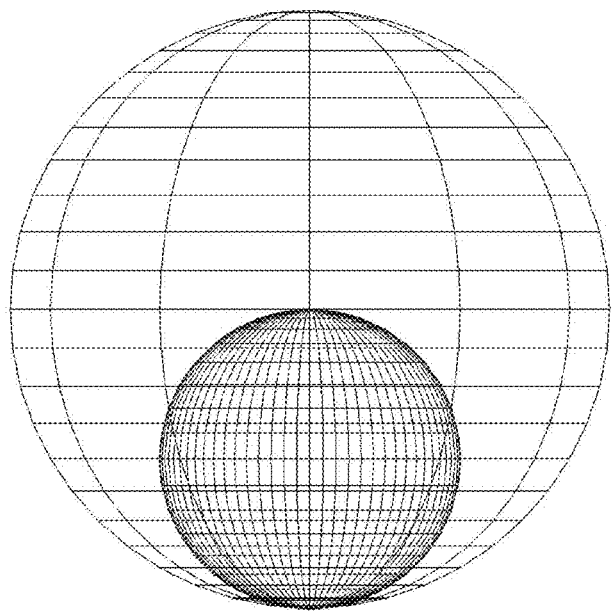
FIG. 1 graphically depicts a luminous intensity plot of a Lambertian emitter.
Figure 2:
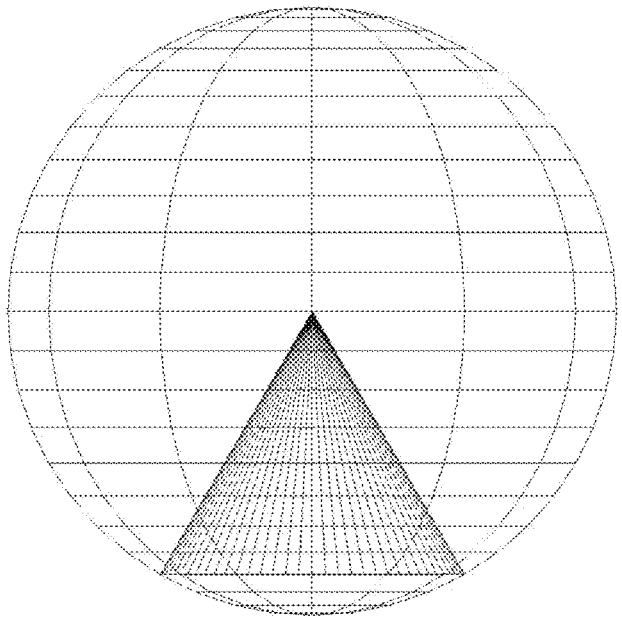
FIG. 2 graphically depicts a luminous intensity distribution satisfying the recommendations of ANSI/IES RP-1, Office Lighting.

The three terms of the velocity update are based on cognitive information (experience gained during the particle's search, represented by the best solution $x_{best}$ in the particle's history); social information (experience gained by the swarm's search, represented by the best solution $x_{global\_best}$ in the swarm's history) and inertia (inertial constraint $\omega \in (0,1)$ based on the particle current direction of movement and velocity) and:

$$v_{inertia}(t)=\omega \times v(t)$$

$$V_{cognitive}(t)=c \times r_{cognitive} \otimes (x_{best}-x(t))$$

$$V_{social}(t)=c \times r_{social} \otimes (x_{global\ best}-x(t))$$

where c is a multiplication constant; $r_{cognitive}$ and $r_{social}$ are random-valued vectors taken from a uniform random distribution (i.e., $r_j \in (0,1) \forall j=1, 2, \ldots, m$), and $\otimes$ is the component-wise vector-vector multiplication operator. The choices of c and $\omega$ are typically dependent on the problem domain, and may be straightforwardly determined by those skilled in the art without undue experimentation; moreover, one or both parameters may be varied during the iterative solution process. Typically, however, a high value of inertia $\omega$ encourages "exploration" of the entire problem domain, while a low value results in "exploitation" of the local neighborhood. A representative implementation of the algorithm suitable for use in connection with the present invention is set forth below. While this particular implementation was found to yield acceptable results, it will be apparent to those skilled in the art that other variants may yield similar results, differing, for example, in the computational time needed to converge to a global solution. Similarly, other evolutionary algorithms, particularly those known to yield successful results with real-valued (as opposed to discrete-valued) problems, may be employed. To determine the lowest-order equation for a lens profile capable of generating a luminous intensity distribution such as that shown in FIG. 2 (for producing constant illuminance on a plane), it has been found that a cubic equation (e.g., $z=ax^3+b$) is generally sufficient as a candidate equation for purposes of step 2, with parameter values that are optimized by the algorithm. The cubic term a determines the shape of the lens, while the constant term b determines the distance of the front lens surface from the light source. Surprisingly, this relationship applies even when an areal light source (such as a bare LED die) or a volumetric light source (such as an LED die embedded in a phosphor matrix) is used, at least for dimensions that do not exceed approximately 10 to 20 percent in width of the diameter of the lens and approximately 10 percent in height of the lens-source distance b. The examples set forth below were designed by applying an evolutionary algorithm to the equations based on arbitrary initial values. In general, evolutionary algorithms will converge to an optimal solution over a wide range of initial values. The hyperbolic lens of Example 5 below was generated from the conic design of Example 6, with its linear profile. Expressing the lens curve as a hyperbolic equation with initial values that produced the linear profile and then iteratively varying the parameters resulted in the hyperbolic lens profile with its narrower luminous intensity distribution. More generally, those skilled in the art of mathematical analysis will understand that an arbitrary smooth curve or surface can be approximated by a low-order mathematical equation using a conventional "curve-fitting" algorithm. The parameters of this equation can then be optimized by the evolutionary algorithm.

Optical elements in accordance herewith may be manufactured in conventional fashion. Individual optical elements can be fabricated from any transparent material (glass, polymer, etc.) by molding, grinding and polishing, casting, or other suitable technique. Particularly in the case of arrays of optical elements, which tend to be polymeric, molding is a suitable fabrication method. The shape of an optical element is designed in accordance with the techniques discussed above, and the complement of this shape is replicated in the mold in the desired array pattern, e.g., by machining, laser etching, 3D printing, or other conventional method. Alternatively, the optical elements may be embossed onto a polymer sheet. Embossing may be accomplished by drawing the polymer sheet through heated roller dies, one of which has a pattern of recesses complementary to the desired element shape. In some processes, the second roller die has projections that mate with the recesses of the first roller die. The combination of pressure and heat impresses the element pattern into the polymer sheet.

Following fabrication, the array is joined (e.g., adhesively bonded) to an array of light-emitting elements such that each of the elements is at least partially aligned with (i.e., centered over) one of the optical elements. As explained below, some misalignment may be tolerable or, depending on the desired output profile, intentional.

EXAMPLES

Figure 4:
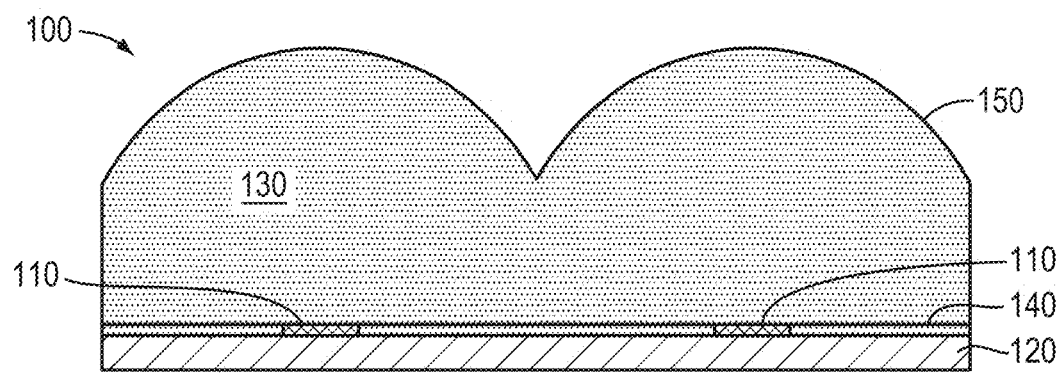
FIG. 4 is a schematic sectional view of a portion of a planar array of light-emitting and optical elements in accordance with embodiments of the present invention.

Several exemplary embodiments of lenses are presented herein. In general, they comprise a planar array 100 of light-emitting elements as shown in FIG. 4. Each light-emitting element 110 comprises a bare InGaN light-emitting diode die coated with a phosphor layer measuring, for example, 1.0 mm wide by 1.0 mm by 0.15 mm thick; the phosphor particles within the layer, which are conventional, absorb a portion of the blue light emitted by the LED die 110 and re-emit it at longer wavelengths to produce, in combination with the blue light emission, white light. The light-emitting elements are mounted in a rectangular array on a substrate 120 such as, for example, multi-cellular polyethylene terephthalate (MC-PET). In an embodiment, the spacing between adjacent light-emitting elements 110 is 7.0 mm and the substrate 120 measures 100 mm wide by 300 mm long.

A layer of transparent material 130 such as, for example, polymethylmeythyl acrylate (PMMA) or polydimethylsiloxane (PDMS), is optically bonded to the substrate 120 using an optically transparent adhesive 140, such as, for example, Norland Optical Adhesive manufactured by Norland Products, Cranbury, N.J. In an embodiment, the transparent material 130 has a thickness of 4.0 mm. The transparent material has optical elements 150 molded or embossed into its exposed face. Each optical element 150 corresponds to, and is substantially centered over, a single light-emitting element 110.

1. Cubic Lens Profile

Figure 5:
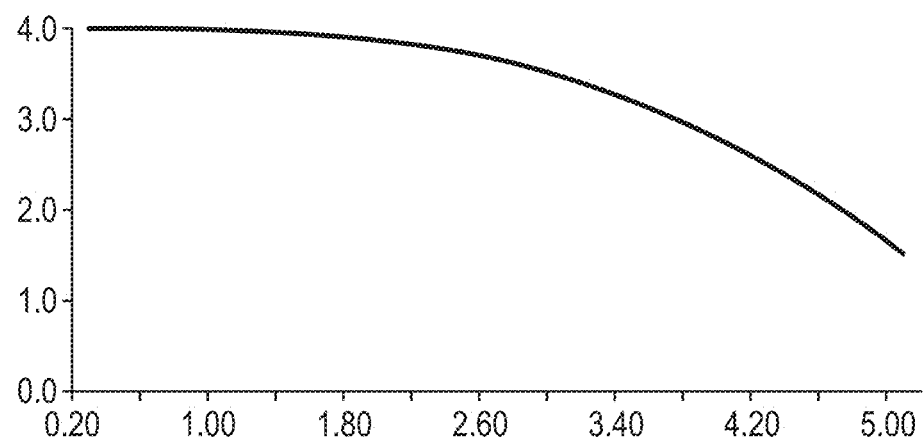
FIG. 5 graphically depicts the profile of a cubic lens profile in accordance with an embodiment of the invention, where (as in similar depictions herein) the ordinate axis represents lens thickness (height) and the abscissa corresponds to distance from the lens center (at the origin).
Figure 6:
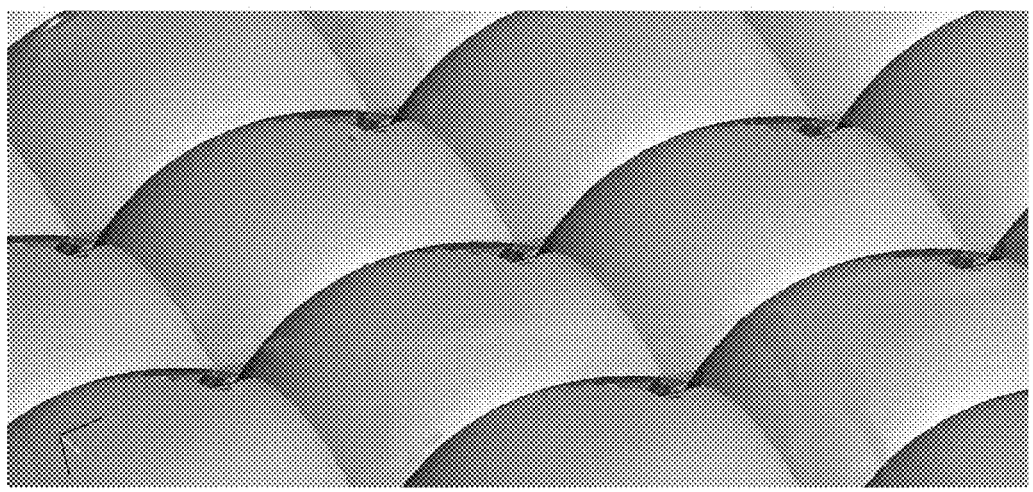
FIG. 6 is a perspective view of an array of lenses having the profile shown in FIG. 5.

In a first exemplary embodiment, each optical element has a rotationally symmetric profile, measured from the opposite face (i.e., looking "up" from substrate 120), embossed into PMMA. The aspherical profile is analytically described by the cubic equation $z=-0.02a^3+b$ between $a=0.0$ and $a=5.0$, and where $b=4.0$. This is illustrated in FIG. 5, in which the ordinate axis represents lens thickness (height) and the abscissa corresponds to distance from the lens center (at the origin). The vertical offset b, the height z, and the width a are measured in millimeters. A computer-generated rendering of the corresponding optical elements is shown in FIG. 6.

Figure 7A:
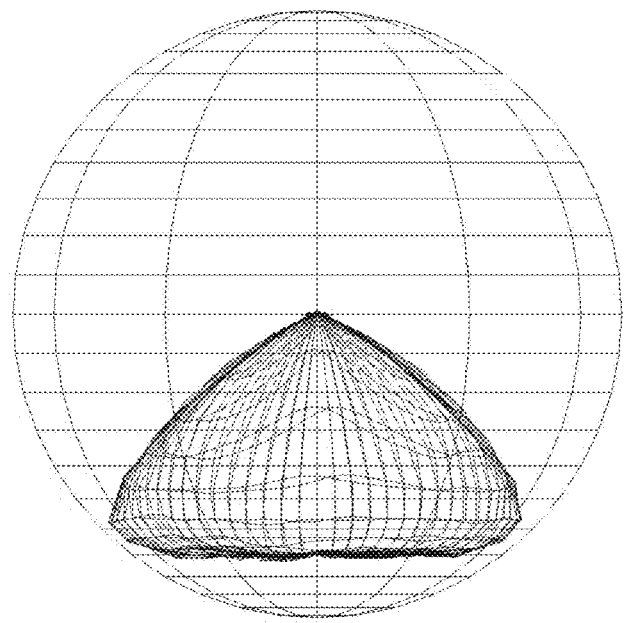
FIGS. 7A and 7B graphically depict the luminous intensity distribution generated by a lens having the profile shown in FIG. 5, with FIG. 7A reflecting a horizontal view and FIG. 7B providing a nadir view (i.e., looking "up" from the "bottom").
Figure 7B:
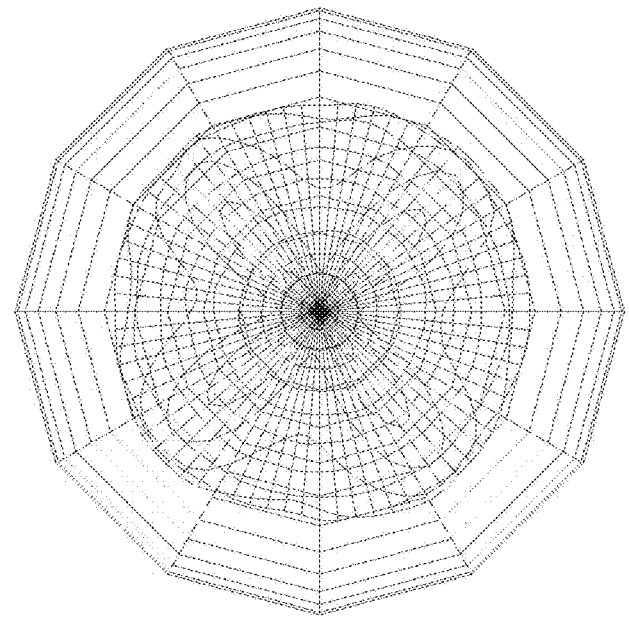

The quadrilaterally symmetric luminous intensity distribution generated by this example is shown in FIGS. 7A (horizontal view) and 7B (nadir view). The quadrilateral distribution is due to both the square light-emitting element 110 and the square optical element 150. The quadrilateral luminous intensity distribution of FIGS. 7A and 7B generate a desirably square illuminance distribution. Since the majority of office spaces are rectangular, such a distribution delivers luminous flux precisely where it is needed. This capability is not possible with conventional linear fluorescent luminaires.

Figure 8:
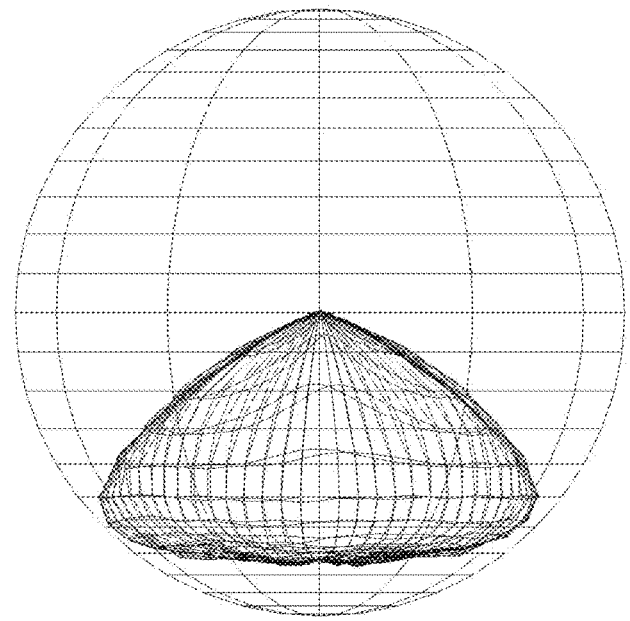
FIGS. 8 and 9 graphically depict horizontal luminous intensity distributions generated by a lens having the profile shown in FIG. 5 with the vertical offset decreased and increased, respectively.
Figure 9:
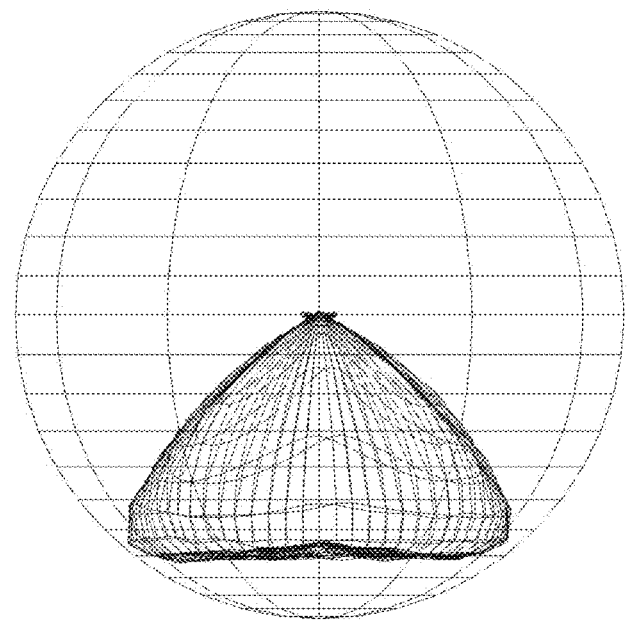

The vertical positioning tolerance with respect to the phosphor emitter influences the luminous intensity distribution. For example, FIG. 8 shows the luminous intensity for the same example except with a vertical offset of b=3.7 mm. Similarly, FIG. 9 shows the luminous intensity for the same example except with a vertical offset of b=4.3 mm. The cutoff angle changes somewhat, but the desirable constant illuminance feature remains essentially unchanged.

The horizontal positioning tolerance with respect to the alignment of the center of the light-emitting element 110 and the axis of rotation for the optical element also influences the luminous intensity distribution. For example, FIG. 10 shows the luminous intensity of the same example except with a horizontal offset of 0.3 mm. This is desirable in that it allows the lenslet array to be tilted about a horizontal axis while still producing a substantially constant illuminance distribution on the workplane or ceiling.

The luminous intensity distribution is minimally influenced by the thickness of the phosphor emitter. FIG. 11A shows the luminous intensity for the same example with a phosphor emitter thickness 0.15 mm, while FIG. 11B shows the luminous intensity distributions for the example with a phosphor emitter thickness 0.35 mm. As can be seen, the distributions are substantially identical.

2. Cubic Fresnel Lens Profile 1

Figure 12:
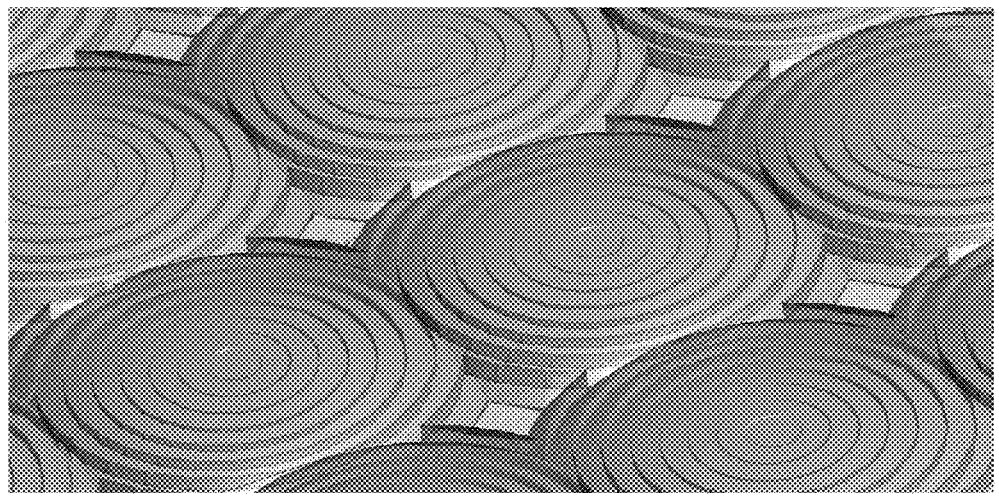
FIG. 12 is a perspective view of an array of lenses in accordance with a Fresnel embodiment corresponding to the cubic profile of FIG. 5.
Figure 13:
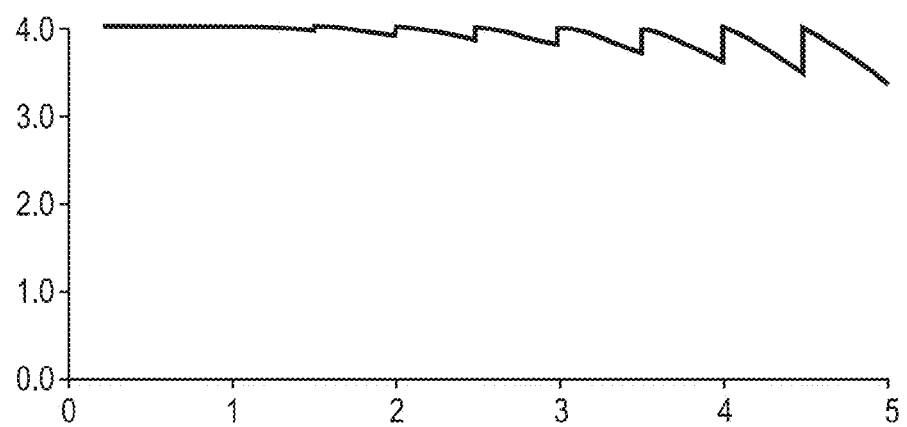
FIG. 13 graphically depicts the profile of a Fresnel lens as shown in FIG. 12.

In a second example embodiment, the above rotationally symmetric lens with a cubic profile can be approximated by a Fresnel lens with 0.5 mm wide segments, as shown in FIG. 12. The profile of each segment is described analytically by the cubic equation $z=-0.02a^3+b+c_{seg}$ between $a=0.0$ and $a=5.0$ mm, $b=4.0$ mm and $c_{seg}$ is a vertical offset chosen to ensure that the inner edge of each segment has height b and a maximum embossing depth of 0.7 mm; as illustrated in FIG. 13, this maximum depth occurs at the outer edge of the lens. More generally, the parameter $c_{seg}$ is a vertical offset that ensures that the inner edge of each Fresnel segment has height b; accordingly, for each segment i, $c_{seg}=0.02a_{i0}^3$, where $a_{i0}$ is the horizontal distance from the center to the inner edge of the segment.

Figure 14A:
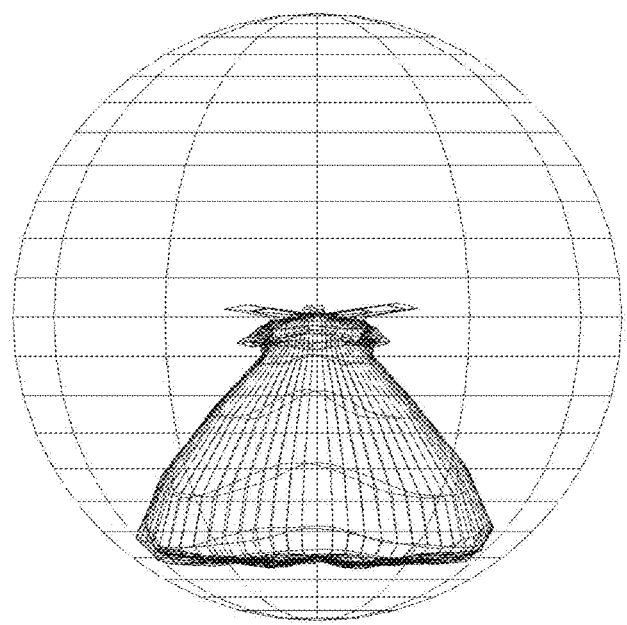
FIGS. 14A and 14B graphically depict the luminous intensity distribution generated by a lens having the profile shown in FIG. 12, with FIG. 14A reflecting a horizontal view and FIG. 14B providing a nadir view.
Figure 14B:
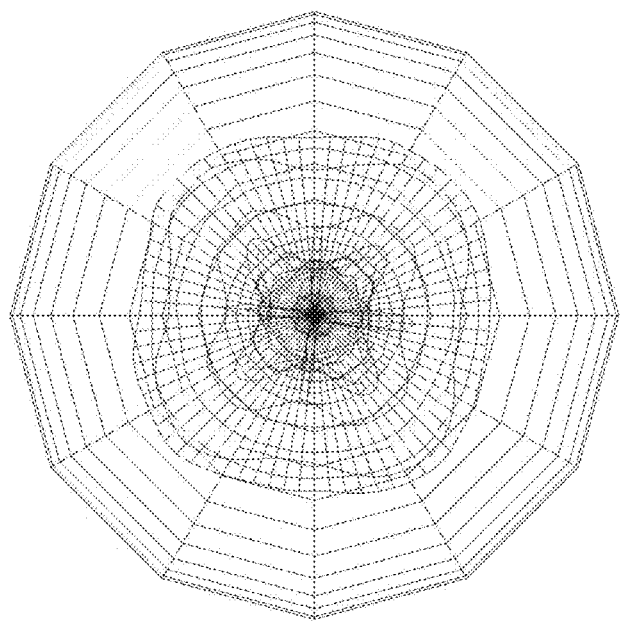

The edges of the Fresnel lens segments result in some stray light, as shown in the luminous intensity distribution shown in FIG. 14A (horizontal view) and FIG. 14B (nadir view). The advantage is that the 0.7 mm embossing depth of the PMMA sheet (compared to the 2.5 mm depth used in the cubic lens design) improves its manufacturability.

3. Cubic Fresnel Lens Profile 2

Figure 15:
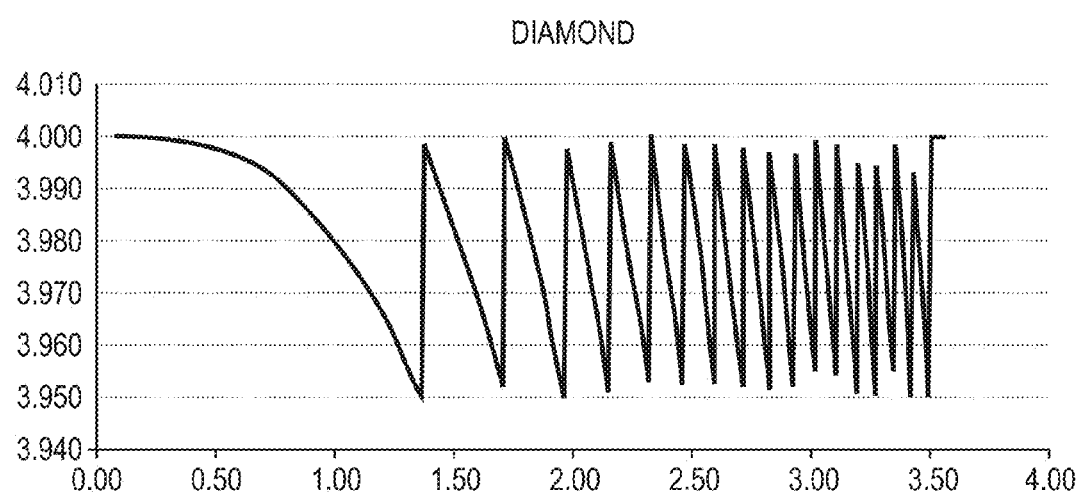
FIG. 15 graphically depicts the profile of a Fresnel embodiment with variable width segments, and corresponding to the cubic profile of FIG. 5.
Figure 16:
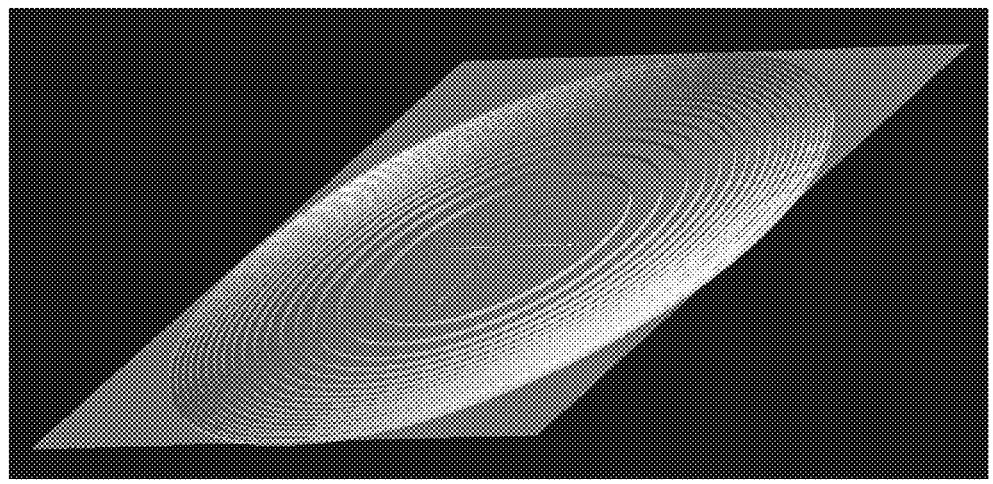
FIG. 16 is a perspective view of a lens having the profile shown in FIG. 15.
Figure 17:
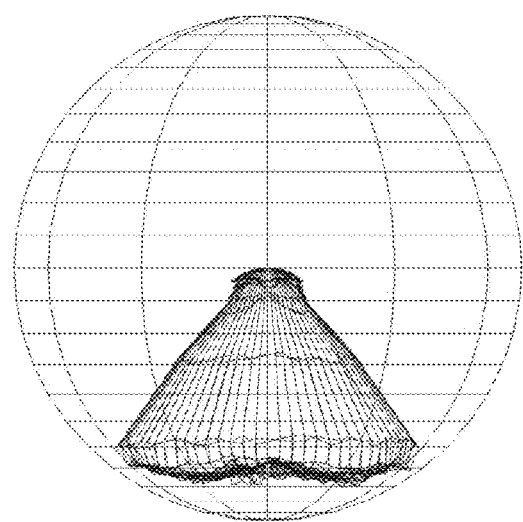
FIG. 17 graphically depicts the horizontal luminous intensity distribution generated by a lens having the profile shown in FIG. 15.
Figure 18:
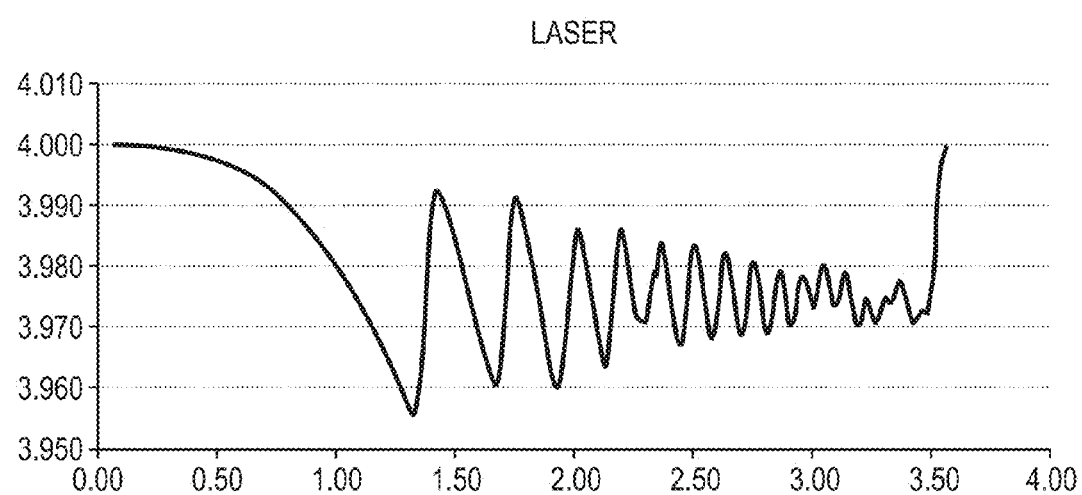
FIG. 18 graphically depicts a lens profile that may be formed using a laser-fabricated embossing mold.
Figure 19:
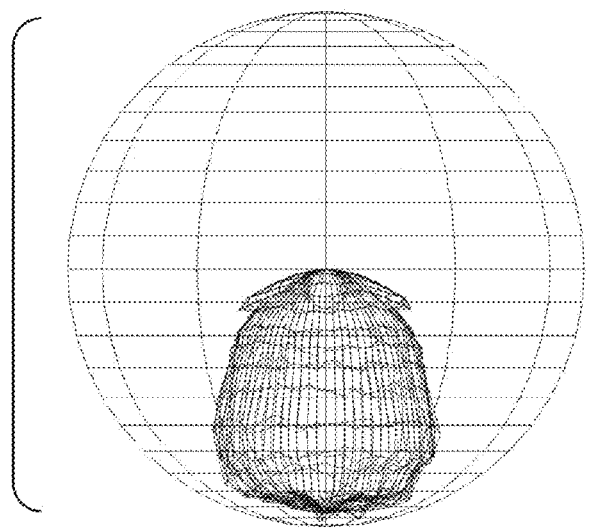
FIG. 19 graphically depicts the horizontal luminous intensity distribution generated by a lens made from a mold with the profile shown in FIG. 18.

In a third exemplary embodiment, the above rotationally symmetric lens with a cubic profile is approximated by a Fresnel lens with variable width segments. The profile of each segment is described analytically by the cubic equation $z=-0.02a^3+b+c_{seg}$ between a=0.0 and a=3.5 mm, and where b=4.0 mm and $c_{seg}$ is chosen such that the inner edge of each segment has height b and an approximately constant depth of 0.05 mm (as shown in FIG. 15). Given that the lenses are spaced 7.0 mm on center, the embossed pattern is circular with flat areas beyond a radius of 3.5 mm; this is illustrated in FIG. 16. The luminous intensity distribution for this lens profile is shown in FIG. 17. An embossing mold for fabricating the illustrated lens is typically diamond-machined, as the radius of the peaks and valleys of the lens profile shown in FIG. 15 should not exceed approximately 0.002 mm. It is also possible to fabricate an embossing mold for the lens profile shown in FIG. 15 using a 3D laser printer that writes the mold pattern into a liquid photopolymer. Assuming a laser beam with a full-width half-maximum (FWHM) beam width of 0.006 mm at the point of focus, the resulting lens profile will be approximately as shown in FIG. 18. The relatively large radius of the peaks and valleys will tend to scatter the incident light, resulting in the luminous intensity distribution shown in FIG. 19.

4. Cubic Linear Lens Profile

Figure 20:
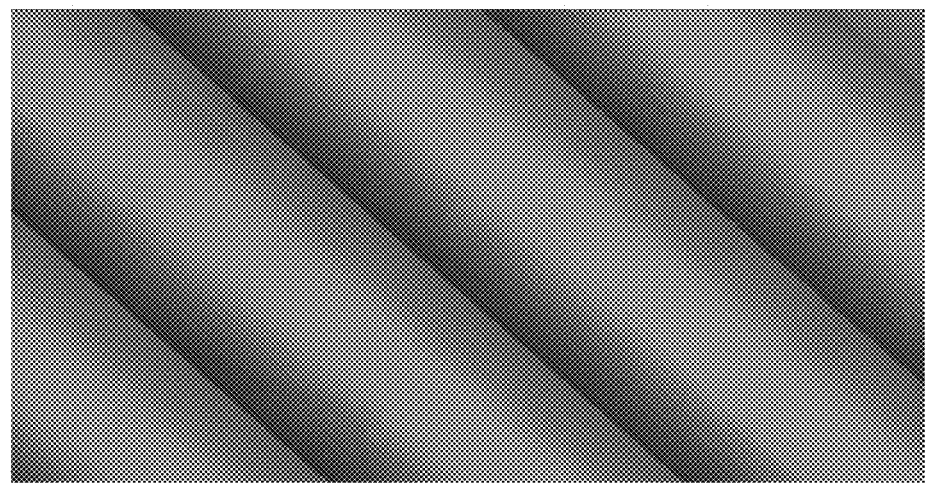
FIG. 20 is a perspective view of an array of linear lenses in accordance with an embodiment of the invention.
Figure 21:
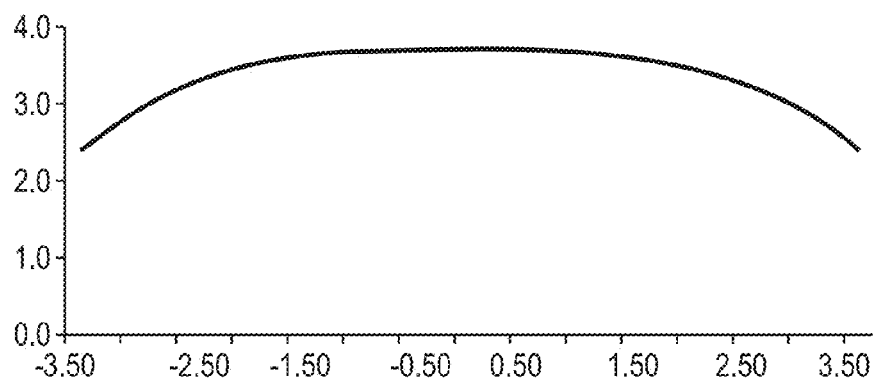
FIG. 21 graphically depicts the profile of a lens as shown in FIG. 20.
Figure 22A:
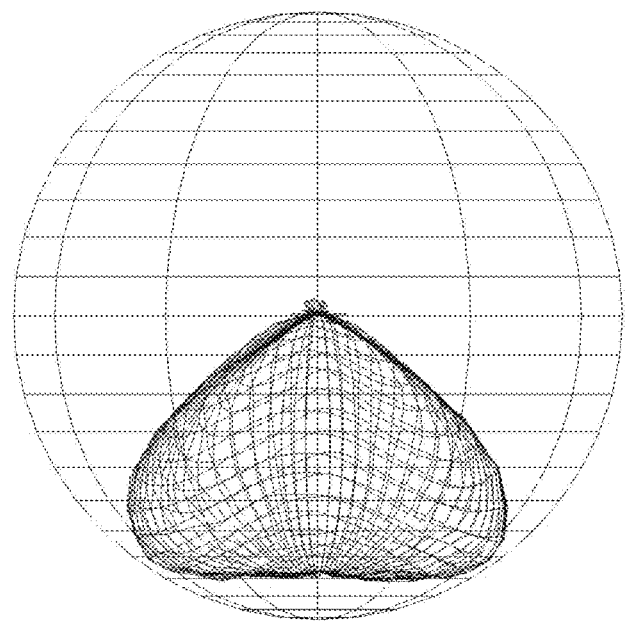
FIGS. 22A-22C graphically depict the luminous intensity distribution generated by a lens having the profile shown in FIG. 20, with FIG. 22A reflecting a lateral view, and FIG. 22B providing a longitudinal view, and FIG. 22C a nadir view.
Figure 22B:
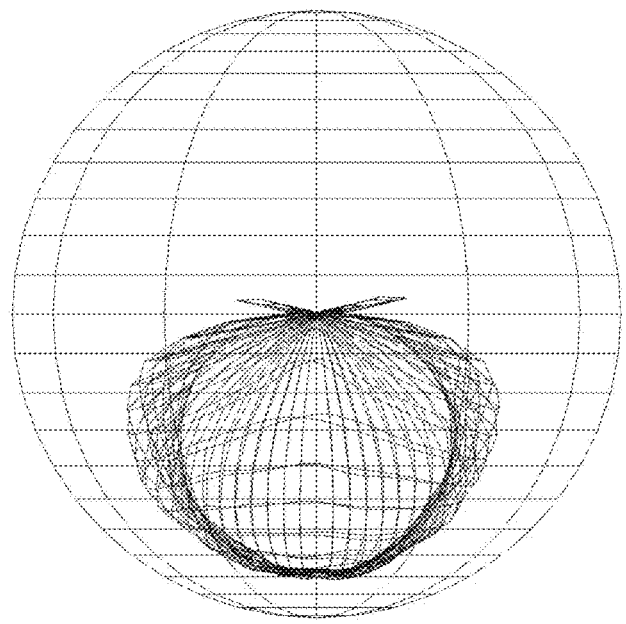
Figure 22C:
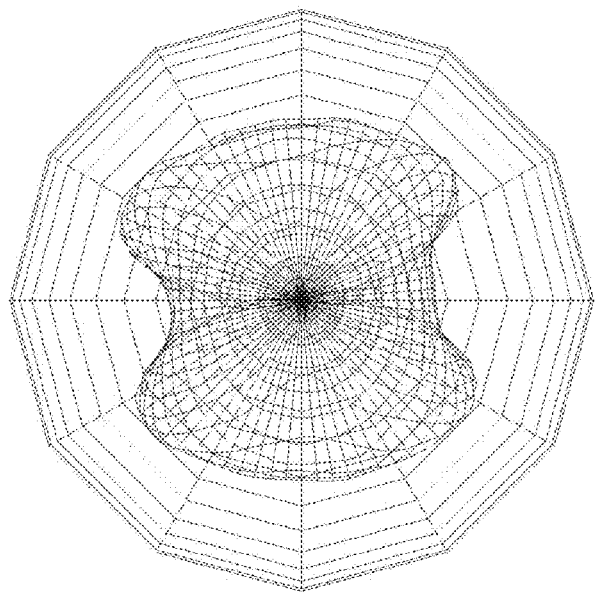

A fourth exemplary embodiment is a linear lens as illustrated in FIG. 20. The lens has a profile described analytically by the cubic equation $z=0.03a^3+b$ between a=−3.5 mm and a=0.0 mm, and $z=-0.03a^3+b$ between a=−3.5 mm and a=0.0 mm, with a maximum value of b=3.7; the resulting profile is illustrated in FIG. 21. This lens produces the bilaterally symmetric luminous intensity distribution shown in FIGS. 22A (lateral view), 22B (longitudinal view), and 22C (nadir view).

5. Hyperbolic Lens Profile

Figure 23:
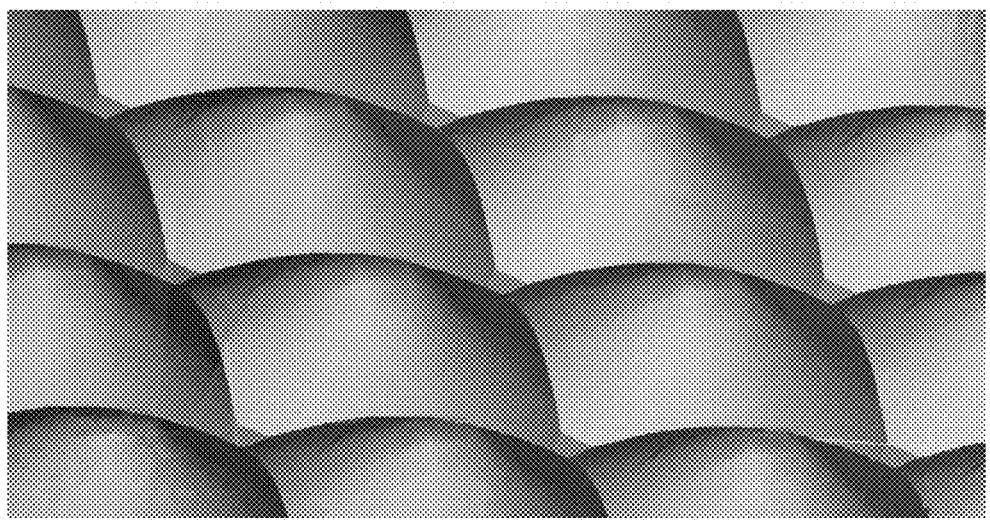
FIG. 23 is a perspective view of an array of lenses in accordance with an embodiment having a hyperbolic lens profile.
Figure 24:
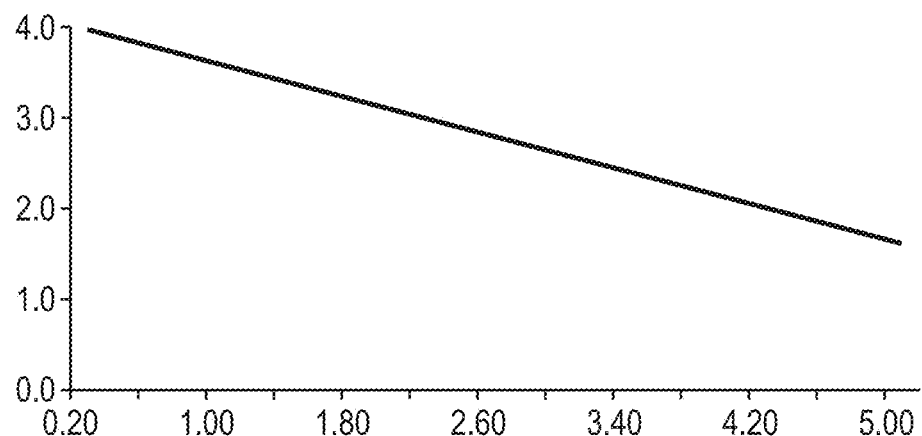
FIG. 24 graphically depicts the profile of a lens as shown in FIG. 23.

In a fifth exemplary embodiment, a hyperbolic lens as illustrated in FIG. 23 produces a highly focused spotlight distribution that may be useful, for example, in theatrical and entertainment lighting applications. The radially symmetric lens profile is described analytically by the quadratic equation $z=b-2a^2/(1+4a)$ between a=0.0 mm and a=5.0 mm, where b=4.0; the lens profile is shown in FIG. 24. This lens produces the radially symmetric luminous intensity distribution shown in FIGS. 25A (horizontal view) and 25B (nadir view). Offsetting the LED die horizontally by 1.5 mm results in the radially symmetric luminous intensity distribution shown in FIGS. 26A (horizontal view) and 26B (nadir view).

6. Conic Lens Profile

Figure 27:
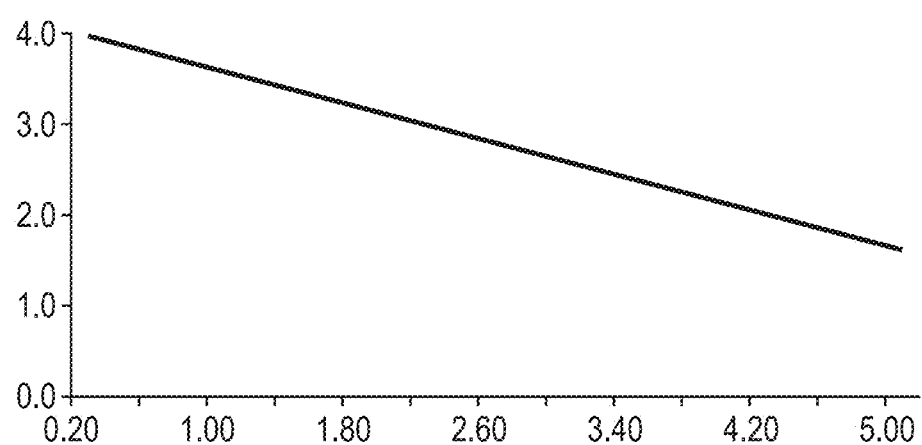
FIG. 27 graphically depicts the profile of a conic lens in accordance with an embodiment of the invention.
Figure 28A:
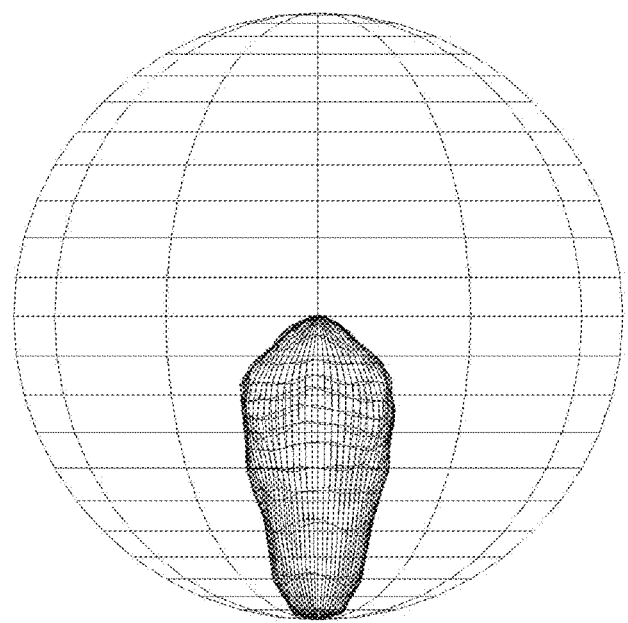
FIGS. 28A and 28B graphically depict the luminous intensity distribution generated by a lens having the profile shown in FIG. 27, with FIG. 28A reflecting a horizontal view and FIG. 28B providing a nadir view.
Figure 28B:
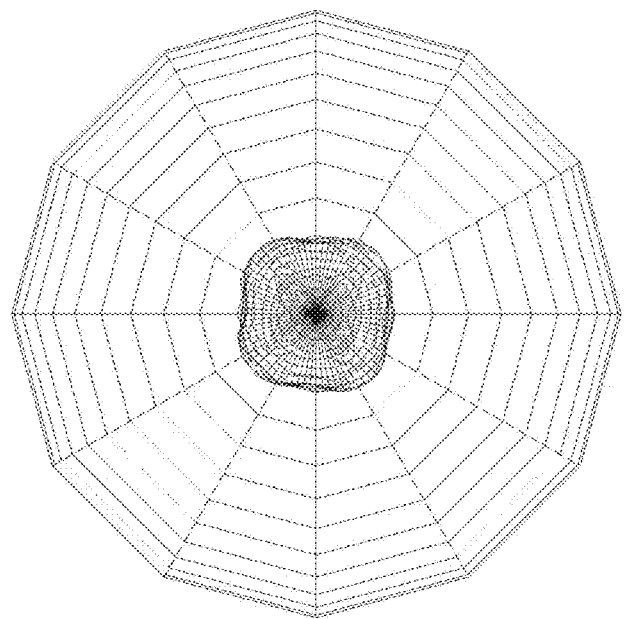

In a sixth exemplary embodiment, a radially symmetric lens with a linear profile (i.e., a conic lens) also produces a highly focused spotlight distribution that may be useful for theatrical and entertainment lighting applications. The radially symmetric lens profile is described analytically by the linear equation $z=-0.4762a+b$ between a=0.0 mm and a=5.0, where b=4.0, and is depicted in FIG. 27. This lens produces the radially symmetric luminous intensity distribution shown in FIG. 28A (horizontal view) and FIG. 28B (nadir view). This distribution is quite similar to the hyperbolic lens, which highlights the sensitivity of the luminous intensity distribution to small changes in the lens profile for such a focused optic.

7. Conic Fresnel Lens Profile

Figure 29:
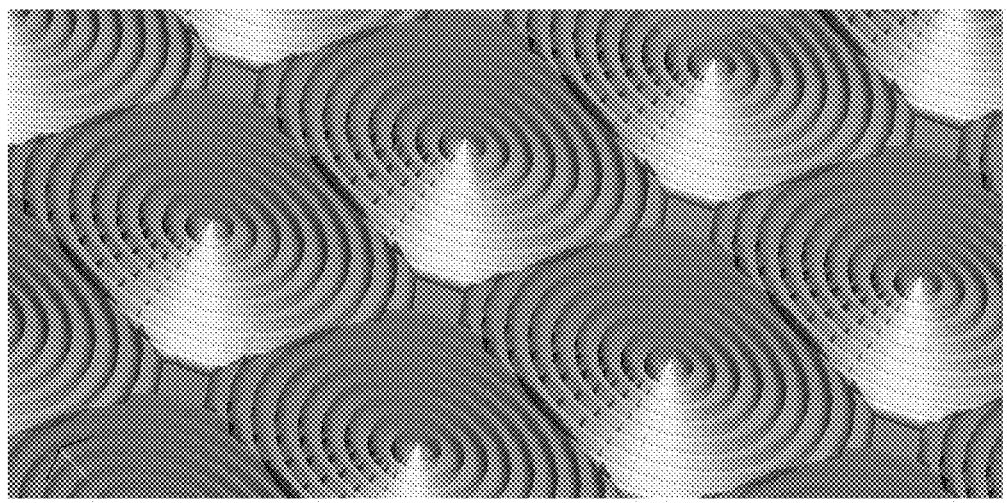
FIG. 29 is a perspective view of an array of Fresnel lenses corresponding to the profile shown in FIG. 27.
Figure 30:
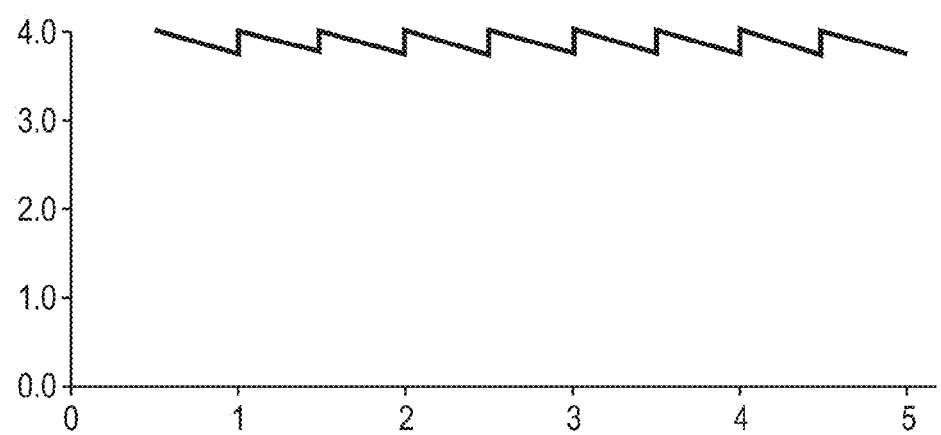
FIG. 30 graphically depicts the profile of the Fresnel lens shown in FIG. 29.
Figure 31A:
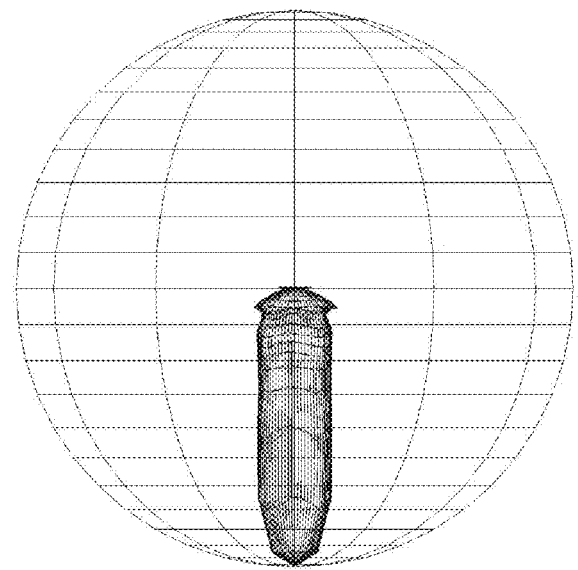
FIGS. 31A and 31B graphically depict the luminous intensity distribution generated by a lens having the profile shown in FIG. 29, with FIG. 31A reflecting a horizontal view and FIG. 31B providing a nadir view.
Figure 31B:
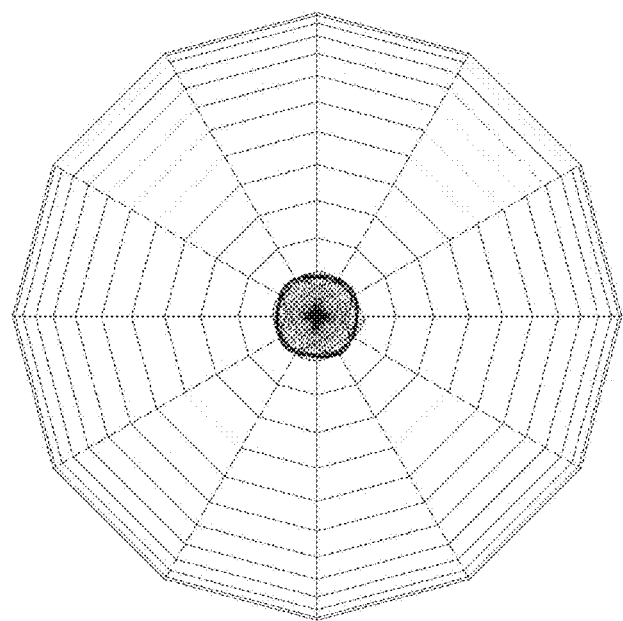

In a seventh exemplary embodiment, the above-described rotationally symmetric lens with a linear profile can be approximated by a Fresnel lens with 0.5 mm wide segments as illustrated in FIG. 29. The radially symmetric lens profile is described analytically by the linear equation $z=-0.4762a+b+c_{seg}$ between a=0.0 mm and a=5.0, where b=4.0 mm and $c_{seg}$ is chosen such that the inner edge of each segment has height b; the resulting profile is illustrated in FIG. 30. This lens produces the radially symmetric luminous intensity distribution shown in FIGS. 31A (horizontal view) and 31B (nadir view). Finally, the exposed surface of the optical element may be patterned or roughened to further diffuse the emitted light and obscure the direct view of the light-emitting element 110 through the transparent substrate 130.

8. Cubic Lens Profile 2

Figure 32:
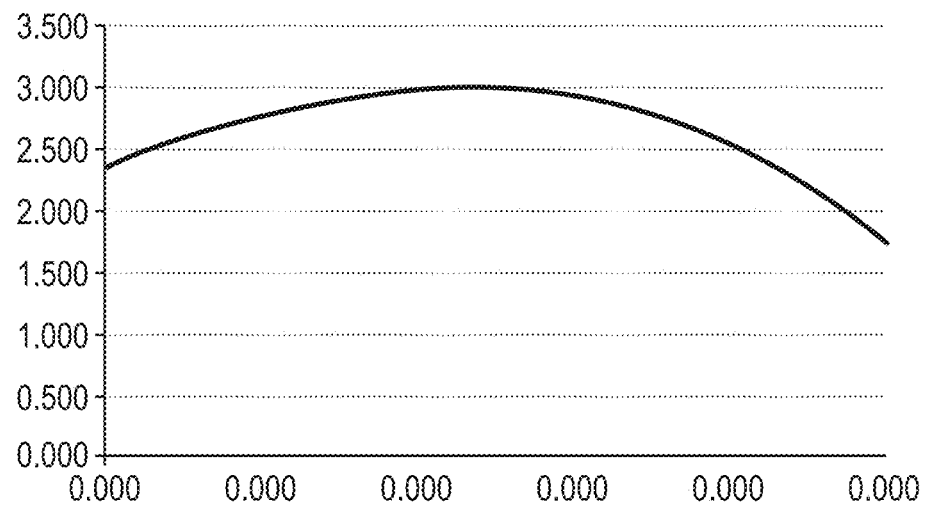
FIG. 32 graphically depicts the profile of a lens having a cubic profile in accordance with an embodiment of the invention.
Figure 33A:
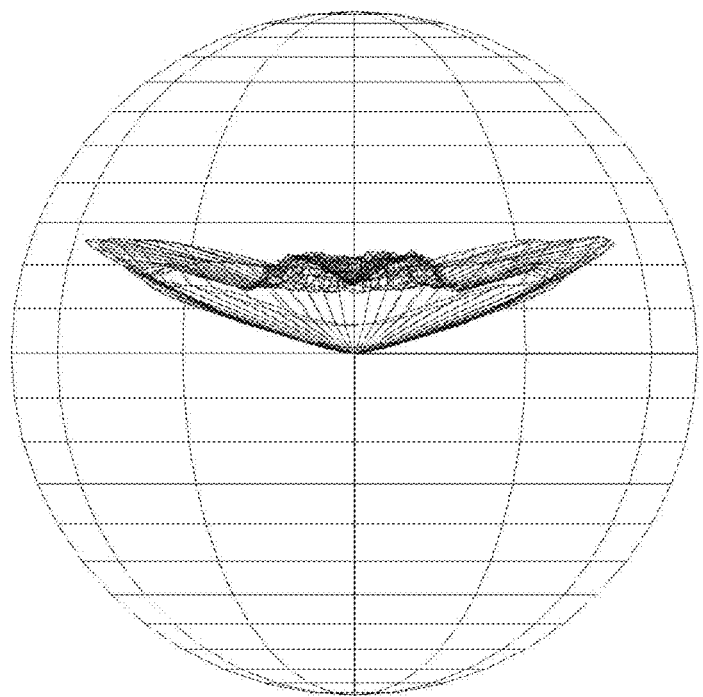
FIGS. 33A and 33B graphically depict the luminous intensity distribution generated by a lens having the profile shown in FIG. 32, with FIG. 33A reflecting a horizontal view and FIG. 33B providing a nadir view.
Figure 33B:
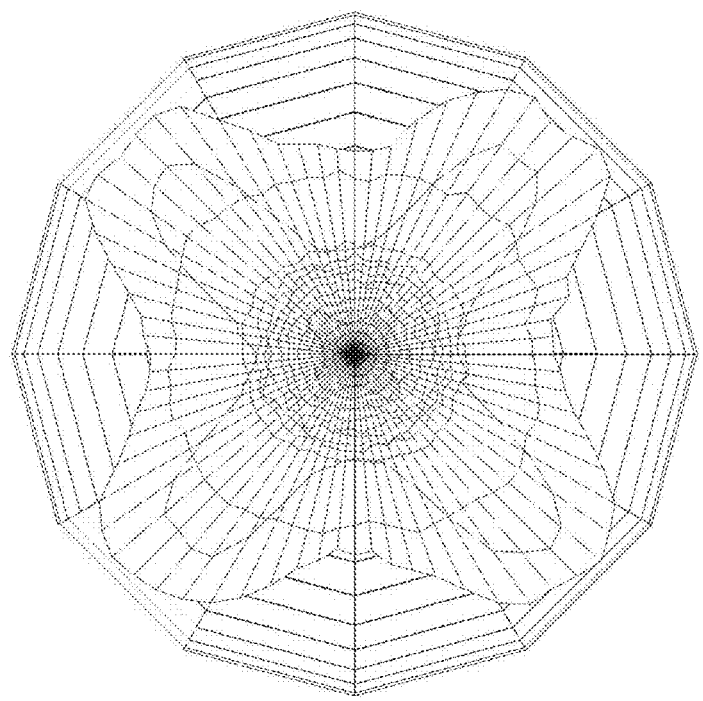

In an eighth exemplary embodiment, each optical element has a rotationally symmetric profile, measured from the opposite face, embossed into PMMA. The aspherical profile is analytically described by the cubic equations $z=b-(a-2.5)^2\times 0.1$ between a=0.0 and a=2.5, and $z=b-(a-2.5)^2\times 0.2$ between a=2.5 and a=5.0, where b=3.0; the resulting profile is shown in FIG. 32. The vertical offset b, the height z, and the width a are measured in millimeters. The resultant batwing distribution, which may be employed for indirect ceiling illumination, is shown in FIG. 33A (horizontal view) and FIG. 33B (nadir view).

9. Working Example 1

Figure 34A:
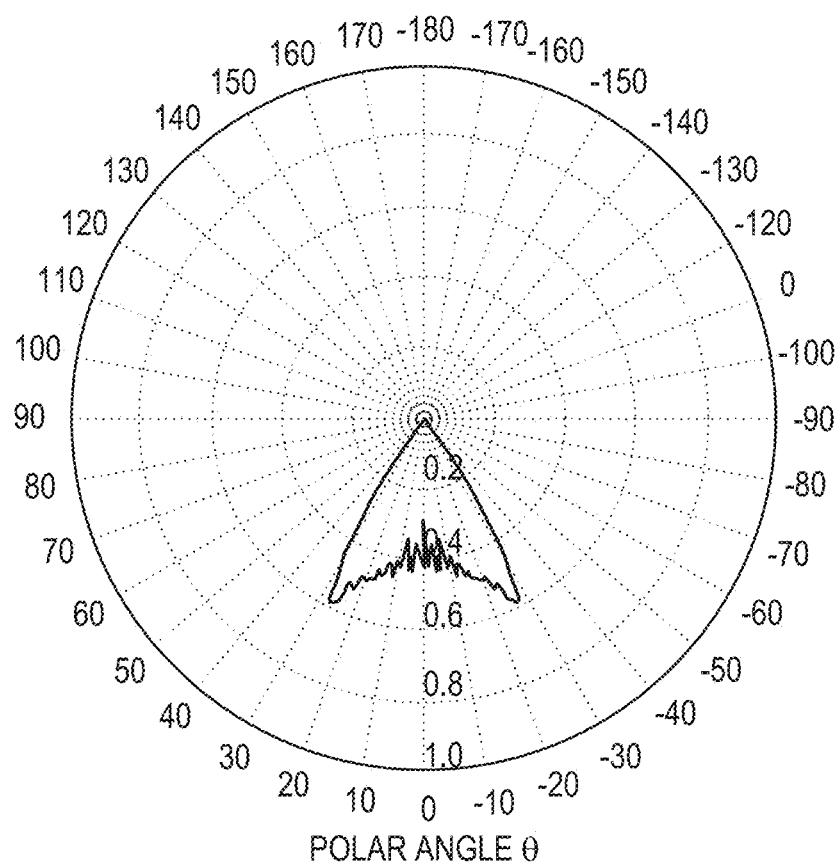
FIGS. 34A and 34B show, respectively, simulated and measured light-distribution patterns for a lens in accordance with a cubic embodiment of the invention.
Figure 34B:
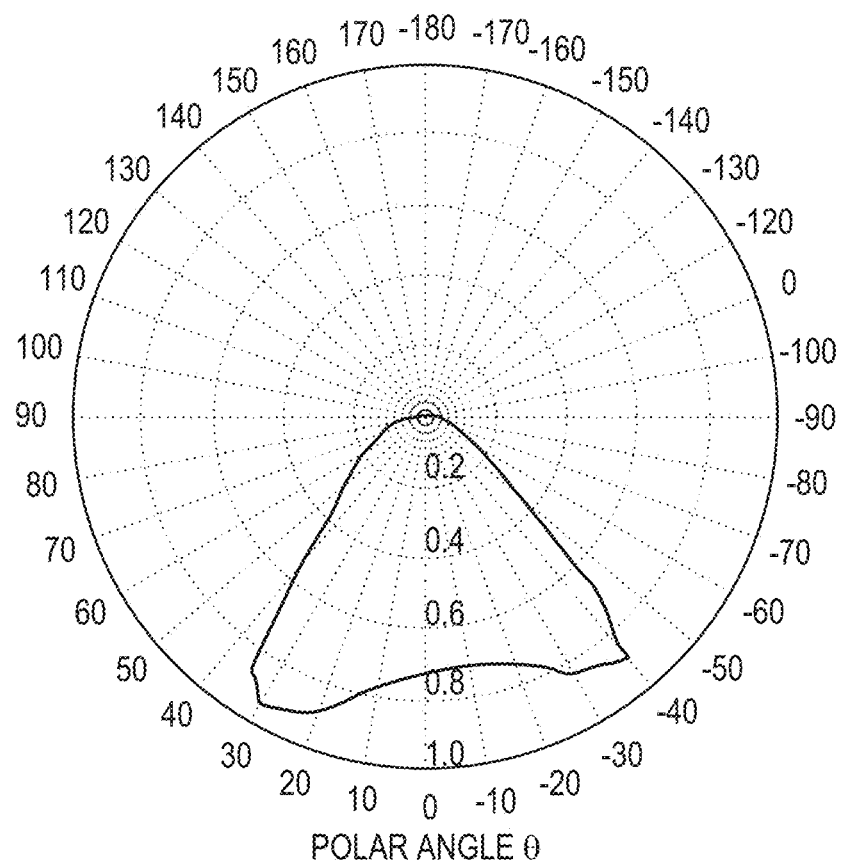

An optic was designed and manufactured according to the first exemplary embodiment to produce a bat-wing distribution, similar to that shown in FIG. 7A. The optic, a rectilinear array of lenses, was formed from PMMA. The lens array size was about 287 mm by about 98 mm by about 4 mm thick. The optic was attached to an array of white-light-emitting LEDs using an index-matched epoxy. FIG. 34A shows a simulation of the light-distribution pattern while FIG. 34B shows the measured light-distribution pattern. As can be seen, this optic produces a well-formed bat-wing distribution pattern.

10. Working Example 2

Figure 25A:
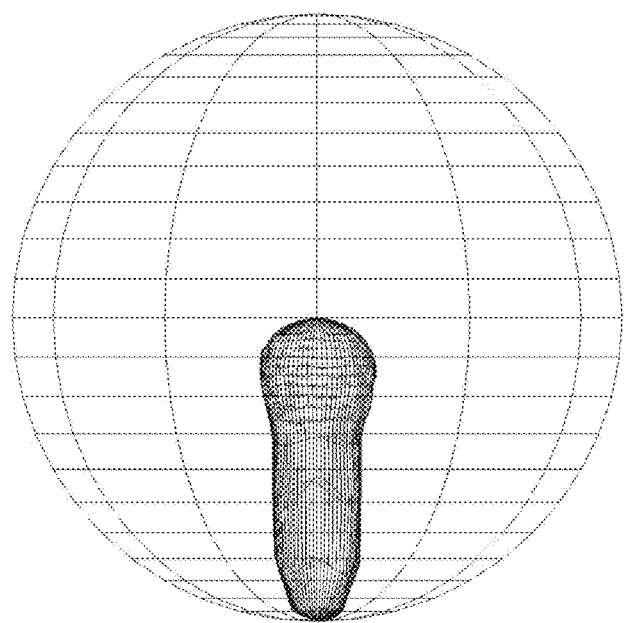
FIGS. 25A and 25B graphically depict the luminous intensity distribution generated by a lens having the profile shown in FIG. 24, with FIG. 25A reflecting a horizontal view and FIG. 25B providing a nadir view.
Figure 25B:
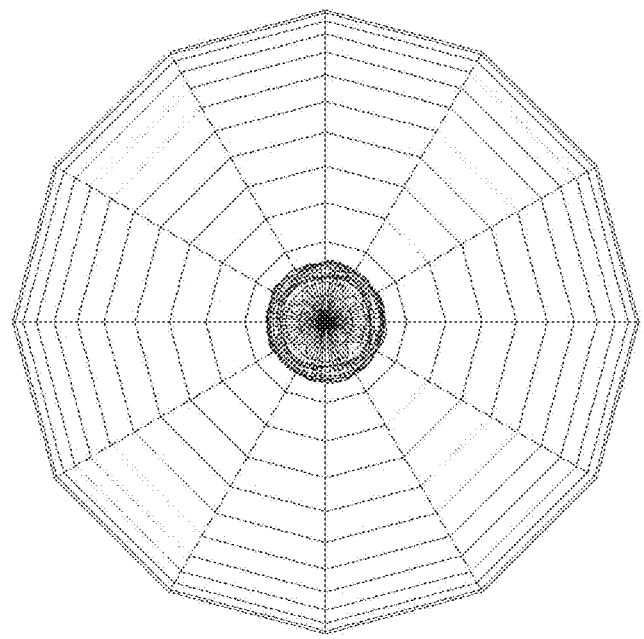
Figure 26A:
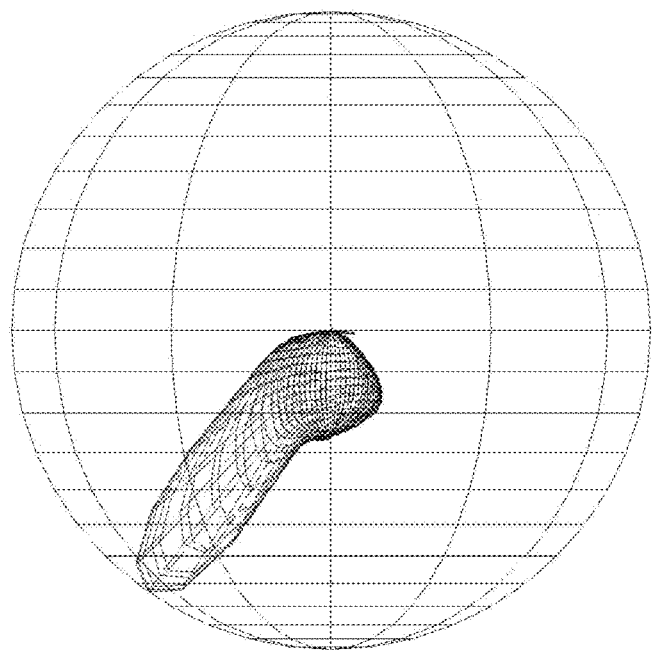
FIGS. 26A and 26B show the corresponding profiles that result when the LED die is offset horizontally.
Figure 26B:
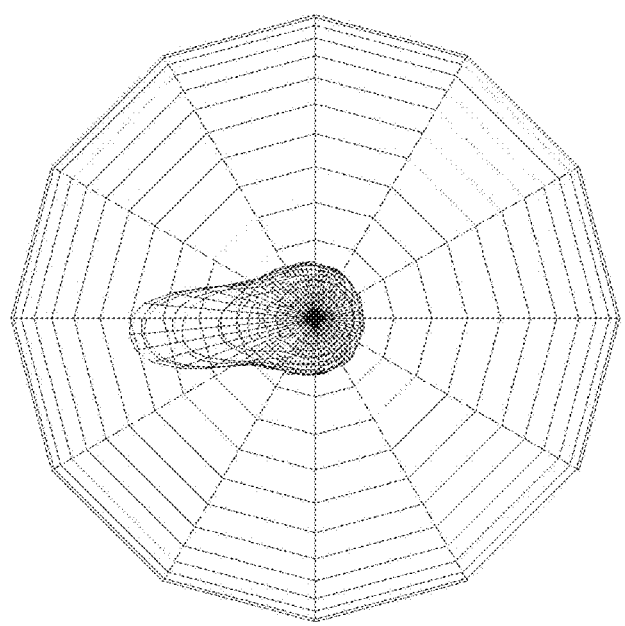
Figure 35:
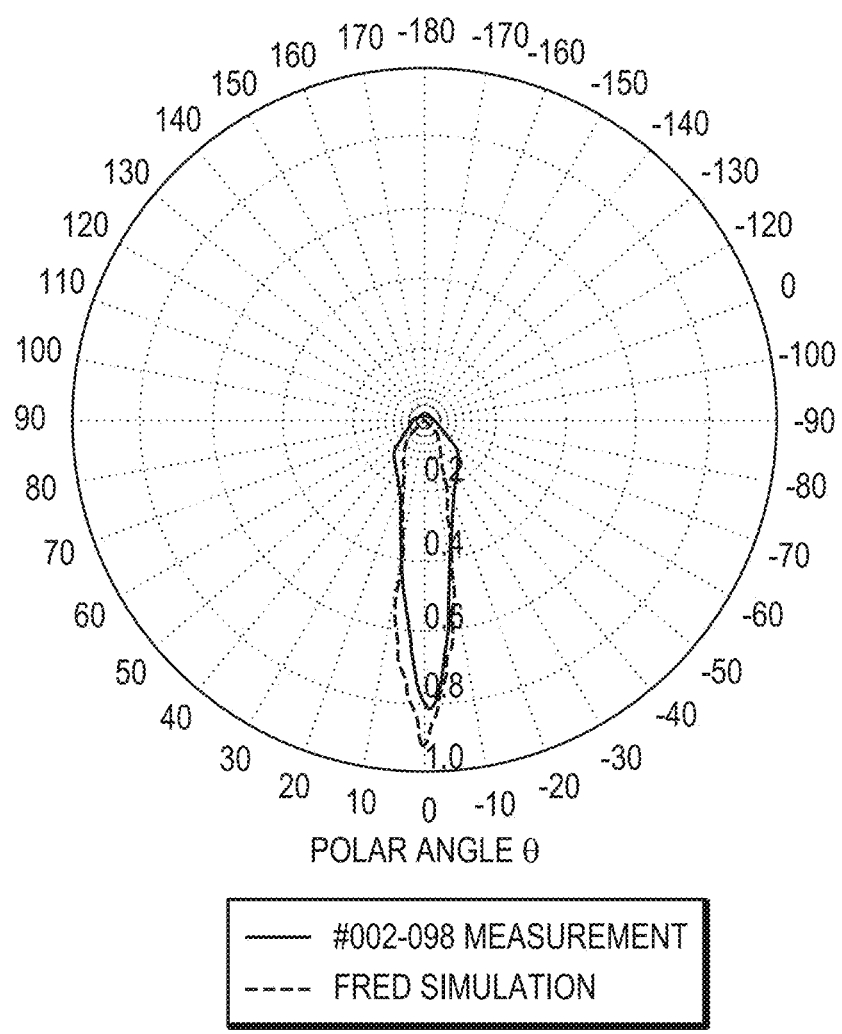
FIG. 35 shows, simulated and measured light-distribution patterns for a lens in accordance with a hyperbolic embodiment of the invention.
Figure 36:
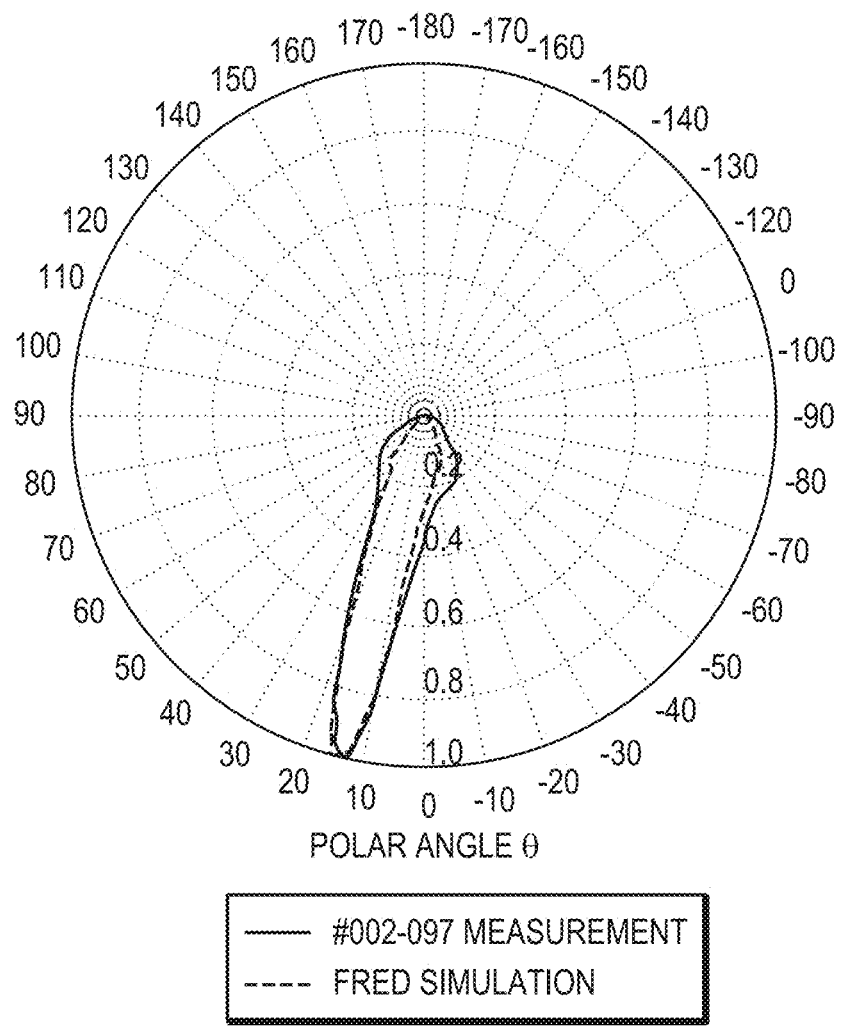
FIG. 36 shows simulated and measured light-distribution patterns for a lens in accordance with another hyperbolic embodiment of the invention.

An optic was designed and manufactured according to the fifth exemplary embodiment to produce a substantially collimated beam, similar to that shown in FIG. 25A. As the term is used herein, a "substantially collimated" beam has a beam angle less than 15°. The optic, comprising a hexagonal array of lenses, was formed from PMMA. The array diameter was about 107 mm and had a thickness of about 3.5 mm. The optic was attached to an array of white light emitting LEDs using UV-cured epoxy with an index of 1.586. FIG. 35 shows a simulation of the light-distribution pattern and the measured light-distribution pattern. As can be seen, this optic produces a highly collimated beam pattern. The same optic was also intentionally misaligned with the optical axis of the white light emitting LEDs in the array by about 1 mm. As shown in the simulation of FIG. 36, this was predicted to produce an asymmetric collimated beam pattern, which is observed in the measured beam profile also shown in FIG. 36.

It should be noted that different LED phosphor package shapes can be used to obtain bilaterally symmetric, quadrilaterally symmetric, or asymmetric luminous intensity distributions. In effect, phosphor package shape becomes another free variable for the evolutionary algorithm to optimize.

Representative Algorithmic Implementation

```
c = 2.0                           // Multiplication constant
inertia_step = 0.005              // Inertia step
max_velocity = 0.05               // Maximum velocity
min_inertia = 0.01                // Minimum inertia
step_count = 0                    // Step counter
DO
    IF step_count == 0
        Initialize candidate equations with random values
        w = 1.0
        velocity_scale = 1000.0
    ENDIF
    // Decrease velocity with each step
    IF velocity_scale > 0.01
        velocity_scale = velocity_scale - step_count * 0.001
    ENDIF
    FOR each candidate
        // Ignore best candidate
        IF best candidate
            CONTINUE
        ENDIF
        Calculate uniform distribution random vector r
        // Update new candidate velocity
        v_inertia = w * v_candidate
        v_social = c * r * (x_best - x_candidate)
        v_cognitive = c * r * (x_global_best - x_candidate)
        v_candidate = velocity_scale * (v_inertia + v_social + v_cognitive)
        // Clamp candidate velocity to maximum
        FOR each dimension j
            IF v_candidate(j) > max_velocity
                v_candidate(j) = v_candidate(j) * r(j) * max_velocity
            ENDIF
        ENDFOR
        // Update new candidate position
        x_candidate = x_candidate + v_candidate
    ENDFOR
    FOR each candidate
        Calculate candidate intensity distribution
        Compare candidate and target distributions
        IF candidate better than best candidate
            Replace best candidate with current candidate
        ENDIF
    ENDFOR
    // Decrease inertia
    IF w > min_inertia
        w = w - inertia_step
    ENDIF
    step_count = step_count + 1
    // Reset step count if maximum
    IF step_count == 1000
        step_count = 0
    ENDIF
UNTIL best candidate matches target
```

While the description above has been mainly with reference to visible light, this is not a limitation of the present invention and in other embodiments the structures and methods described herein may be applied to radiation outside of the visible spectrum, for example in the infrared and ultraviolet radiation ranges.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A luminaire producing a light distribution that provides a spatially constant luminous intensity distribution, the luminaire comprising:
    an array of light-emitting elements; and
    a lens array comprising a continuous layer of transparent material having a first surface for receiving light from the light-emitting elements and, formed on a second surface thereof opposed to the first surface, a two-dimensional array of aspheric lens elements each (i) being optically coupled to a closest one of the light-emitting elements and (ii) producing an out-of-focus image thereof on a planar surface located at a predetermined distance from the lens array, the images combining to generate a spatially constant illumination over the planar surface, wherein each of the light-emitting elements (i) has an optical axis shifted relative to an optical axis of the closest lens element and (ii) is directly bonded to the first surface.

2. The luminaire of claim 1 wherein the lens elements each have a lens profile described by the lowest-order mathematical equation that generates a predetermined luminous intensity distribution when light emitted by the light-emitting elements and passing through the lens elements is combined, the profile specifying a lens shape and a lens thickness.

3. The luminaire of claim 2 wherein the equation comprises parameters including a refractive index of the lens and dimensions of the light-emitting element, the thickness corresponding to a distance from a front surface of the lens element to the light-emitting element.

4. The luminaire of claim 2 wherein the equation is a quadratic equation.

5. The luminaire of claim 2 wherein the equation is a cubic equation.

6. The luminaire of claim 2 wherein each lens element has an aspheric cubic lens profile.

7. The luminaire of claim 2 wherein each lens element has an aspheric cubic linear lens profile.

8. The luminaire of claim 1 wherein the light-emitting elements have rectangular emission surfaces.

9. The luminaire of claim 2 wherein each lens element produces a batwing luminous distribution profile.

10. The luminaire of claim 2 wherein each lens element produces a substantially collimated light distribution profile.

11. The luminaire of claim 10, wherein the collimated light distribution profile has a beam angle less than 15°.

12. The luminaire of claim 2, wherein the light distribution of each lens element is asymmetric.

13. The luminaire of claim 12 wherein the asymmetric light distribution is an asymmetric collimated light distribution.

14. The luminaire of claim 13, wherein the asymmetric collimated light distribution has a beam angle less than 15°.

15. A method of manufacturing a luminaire for achieving a predetermined luminous intensity distribution, the method comprising the steps of:

designing one or more optical elements to produce an out-of-focus image of a light source by computationally modifying an initial lens profile until a resulting profile is described by the lowest-order mathematical equation that will generate the predetermined light intensity distribution from the light source;

providing a plurality of the light sources arranged in an array;

manufacturing a plurality of the optical elements; and associating the optical elements with the light sources such that each of the optical elements produces an out-of-focus image of an associated light source, the images combining to generate the predetermined luminous intensity distribution, thereby forming a luminaire comprising:

an array of light-emitting elements; and a lens array comprising a continuous layer of transparent material having a first surface for receiving light from the light-emitting elements and, formed on a second surface thereof opposed to the first surface, a two-dimensional array of aspheric lens elements each (i) being optically coupled to a closest one of the light-emitting elements and (ii) producing an out-of-focus image thereof on a planar surface located at a predetermined distance from the lens array, the images combining to generate a spatially constant illumination over the planar surface, wherein each of the light-emitting elements (i) has an optical axis shifted relative to an optical axis of the closest lens element and (ii) is directly bonded to the first surface.

16. The method of claim 15, wherein the initial lens profile is spherical.

17. The method of claim 15, wherein at least one optical element is a lens, and the lens is manufactured by molding.

18. The method of claim 15, wherein at least one optical element is a lens, and the lens is manufactured by embossing.

19. The luminaire of claim 1, wherein the light-emitting elements are uniformly offset relative to the lens element optical axes.

20. The luminaire of claim 1, wherein each of the lens elements is in contact with neighboring lens elements.

* * * * *